(12) United States Patent
Bassampour et al.

(10) Patent No.: US 12,194,699 B2
(45) Date of Patent: Jan. 14, 2025

(54) EMBEDDED HYDROGEL CONTACT LENSES

(71) Applicant: Alcon Inc., Fribourg (CH)

(72) Inventors: Zahra Bassampour, Alpharetta, GA (US); Chandana Kolluru, Suwanee, GA (US); Steve Yun Zhang, Sugar Hill, GA (US); Junhao Ge, Redwood City, CA (US); Yang Zheng, Alpharetta, GA (US); Cornelius Daniel Niculas, Suwanee, GA (US); David Andrew Icenogle, Brookhaven, GA (US); Jing Cheng, Brea, CA (US); Yuan Chang, Atlanta, GA (US); Augustine Twum Kumi, Grayson, GA (US); Michelle Plavnik, Atlanta, GA (US)

(73) Assignee: Alcon Inc., Fribourg (CH)

( * ) Notice: Subject to any disclaimer, the term of this patent is extended or adjusted under 35 U.S.C. 154(b) by 496 days.

(21) Appl. No.: 17/710,199

(22) Filed: Mar. 31, 2022

(65) Prior Publication Data

US 2022/0324187 A1    Oct. 13, 2022

Related U.S. Application Data

(60) Provisional application No. 63/169,384, filed on Apr. 1, 2021.

(51) Int. Cl.
*B29D 11/00* (2006.01)
*C08J 3/075* (2006.01)
(Continued)

(52) U.S. Cl.
CPC .... *B29D 11/0048* (2013.01); *B29D 11/00057* (2013.01); *B29D 11/00134* (2013.01);
(Continued)

(58) Field of Classification Search
CPC .......... B29D 11/0048; B29D 11/00057; B29D 11/00134; B29D 11/00221;
(Continued)

(56) References Cited

U.S. PATENT DOCUMENTS

| 4,136,250 A | 1/1979 | Mueller et al. |
|---|---|---|
| 4,153,641 A | 5/1979 | Deichert et al. |

(Continued)

FOREIGN PATENT DOCUMENTS

| EP | 0632329 A1 | 1/1995 |
|---|---|---|
| EP | 3699676 A1 | 8/2020 |

(Continued)

OTHER PUBLICATIONS

K. J. Sax, et al. "Preparation and Infrared Absorption Spectra of Some Phenyl Ethers", J. Org. Chem., 1960, vol. 25 (9), pp. 1590-1595.

*Primary Examiner* — James C. Jones
(74) *Attorney, Agent, or Firm* — Jian Zhou

(57) ABSTRACT

The invention relates to a method for producing embedded hydrogel contact lenses involving a set of 3-mold halves consisting essentially of: one female lens mold half having a molding surface defining the anterior surface of a contact lens; one male lens mold half having a molding surface defining the posterior surface of the contact lens; and an insert mold half having a molding surface defining one of the front and back surfaces of an insert. One of the lens mold halves is used twice: first with the insert mold half for molding an insert during first curing process and then with the other lens mold half for molding an embedded hydrogel contact lens with the molded insert embedded partially or fully therein during second curing process. The invention also relates to embedded hydrogel contact lenses produced from a method of the invention.

23 Claims, 2 Drawing Sheets

(51) Int. Cl.
  *C08J 3/24* (2006.01)
  *G02C 7/04* (2006.01)
  *B29K 83/00* (2006.01)
  *B29K 633/04* (2006.01)

(52) U.S. Cl.
  CPC ......... B29D 11/00221 (2013.01); C08J 3/075 (2013.01); C08J 3/24 (2013.01); G02C 7/049 (2013.01); *B29K 2083/00* (2013.01); *B29K 2633/08* (2013.01); *B29K 2715/00* (2013.01); *C08J 2383/04* (2013.01)

(58) Field of Classification Search
  CPC ........ B29D 11/00048; B29D 11/00038; B29D 11/00067; B29D 11/00125; B29D 11/00403; C08J 3/075; C08J 3/24; C08J 2383/04; G02C 7/049; G02C 7/102; B29K 2083/00; B29K 2633/08; B29K 2715/00; C08G 77/442; C08G 77/80; G02B 1/043
  See application file for complete search history.

(56) References Cited

U.S. PATENT DOCUMENTS

| | | | |
|---|---|---|---|
| 4,182,822 A | 1/1980 | Chang | |
| 4,189,546 A | 2/1980 | Deichert et al. | |
| 4,254,248 A | 3/1981 | Friends et al. | |
| 4,268,132 A | 5/1981 | Neefe | |
| 4,276,402 A | 6/1981 | Chromecek et al. | |
| 4,327,203 A | 4/1982 | Deichert et al. | |
| 4,341,889 A | 7/1982 | Deichert et al. | |
| 4,343,927 A | 8/1982 | Chang | |
| 4,355,147 A | 10/1982 | Deichert et al. | |
| 4,401,371 A | 8/1983 | Neefe | |
| 4,444,711 A | 4/1984 | Schad | |
| 4,460,534 A | 7/1984 | Boehm et al. | |
| 4,486,577 A | 12/1984 | Mueller | |
| 4,543,398 A | 9/1985 | Bany | |
| 4,605,712 A | 8/1986 | Mueller | |
| 4,661,575 A | 4/1987 | Glenn | |
| 4,684,538 A | 8/1987 | Klemarczyk | |
| 4,703,097 A | 10/1987 | Wingler | |
| 4,833,218 A | 5/1989 | Lee | |
| 4,837,289 A | 6/1989 | Mueller | |
| 4,929,693 A | 5/1990 | Akashi et al. | |
| 4,954,586 A | 9/1990 | Nobuyuki et al. | |
| 4,954,587 A | 9/1990 | Mueller | |
| 5,034,461 A | 7/1991 | Lai et al. | |
| 5,070,215 A | 12/1991 | Bambury et al. | |
| 5,098,546 A | 3/1992 | Kawashima et al. | |
| 5,156,726 A | 10/1992 | Nakada et al. | |
| 5,166,345 A | 11/1992 | Akashi et al. | |
| 5,416,132 A | 5/1995 | Yokoyama et al. | |
| 5,449,729 A | 9/1995 | Lai | |
| 5,527,925 A | 6/1996 | Chabrecek et al. | |
| 5,583,163 A | 12/1996 | Müller | |
| 5,665,840 A | 9/1997 | Pöhlmann et al. | |
| 5,712,356 A | 1/1998 | Bothe et al. | |
| 5,760,100 A | 6/1998 | Nicolson et al. | |
| 5,843,346 A | 12/1998 | Morrill | |
| 5,849,841 A | 12/1998 | Mühlebach et al. | |
| 5,894,002 A | 4/1999 | Boneberger et al. | |
| 6,017,121 A | 1/2000 | Chateau et al. | |
| 6,019,914 A | 2/2000 | Lokshin et al. | |
| 6,113,814 A | 9/2000 | Gemert et al. | |
| 6,149,841 A | 11/2000 | Kumar | |
| 6,165,408 A | 12/2000 | Steinmann | |
| 6,166,236 A | 12/2000 | Bambury | |
| 6,221,303 B1 | 4/2001 | Steinmann | |
| 6,296,785 B1 | 10/2001 | Nelson et al. | |
| 6,303,687 B1 | 10/2001 | Müller | |
| 6,348,604 B1 | 2/2002 | Nelson et al. | |
| 6,472,489 B1 | 10/2002 | Stockinger | |
| 6,479,587 B1 | 11/2002 | Stockinger et al. | |
| 6,492,478 B1 | 12/2002 | Steinmann | |
| 6,579,918 B1 | 6/2003 | Auten | |
| 6,851,805 B2 | 2/2005 | Blum et al. | |
| 6,867,245 B2 | 3/2005 | Iwata et al. | |
| 6,995,192 B2 | 2/2006 | Phelan et al. | |
| 7,104,648 B2 | 9/2006 | Dahi et al. | |
| 7,214,809 B2 | 5/2007 | Zanini | |
| 7,423,074 B2 | 9/2008 | Lai | |
| 7,490,936 B2 | 2/2009 | Blum et al. | |
| 7,556,750 B2 | 7/2009 | Xiao et al. | |
| 7,584,630 B2 | 9/2009 | Van Gemert | |
| 7,605,190 B2 | 10/2009 | Moszner et al. | |
| 7,883,207 B2 | 2/2011 | Iyer | |
| 7,931,832 B2 | 4/2011 | Pugh et al. | |
| 7,977,430 B2 | 7/2011 | Devlin et al. | |
| 7,999,989 B2 | 8/2011 | Asai et al. | |
| 8,154,804 B2 | 4/2012 | McGinn et al. | |
| 8,158,037 B2 | 4/2012 | Chopra et al. | |
| 8,215,770 B2 | 7/2012 | Blum et al. | |
| 8,348,424 B2 | 1/2013 | Pugh et al. | |
| 8,415,405 B2 | 4/2013 | Maggio | |
| 8,475,529 B2 | 7/2013 | Clarke | |
| 8,480,227 B2 | 7/2013 | Qiu et al. | |
| 8,529,057 B2 | 9/2013 | Qiu | |
| 8,614,261 B2 | 12/2013 | Iwata | |
| 8,658,748 B2 | 2/2014 | Liu et al. | |
| 8,697,770 B2 | 4/2014 | Duis et al. | |
| 8,741,188 B2 | 6/2014 | Chopra et al. | |
| 8,835,525 B2 | 9/2014 | Kuyu et al. | |
| 8,874,182 B2 | 10/2014 | Etzkorn et al. | |
| 8,922,898 B2 | 12/2014 | Legerton et al. | |
| 8,993,651 B2 | 3/2015 | Chang | |
| 9,052,438 B2 | 6/2015 | Xiao et al. | |
| 9,097,840 B2 | 8/2015 | Chang et al. | |
| 9,097,916 B2 | 8/2015 | Chopra et al. | |
| 9,103,965 B2 | 8/2015 | Chang | |
| 9,155,614 B2 | 10/2015 | Blum et al. | |
| 9,176,332 B1 | 11/2015 | Etzkorn et al. | |
| 9,217,813 B2 | 12/2015 | Liu et al. | |
| 9,296,158 B2 | 3/2016 | Pugh et al. | |
| 9,465,234 B2 | 10/2016 | Chopra et al. | |
| 9,475,827 B2 | 10/2016 | Chang et al. | |
| 9,618,773 B2 | 4/2017 | Clarke et al. | |
| 9,731,437 B2 | 8/2017 | Pugh et al. | |
| 9,889,615 B2 | 2/2018 | Pugh et al. | |
| 9,904,074 B2 | 2/2018 | Duis et al. | |
| 9,977,260 B2 | 5/2018 | Pugh et al. | |
| 10,064,977 B2 | 9/2018 | Jiang et al. | |
| 10,081,697 B2 | 9/2018 | Huang et al. | |
| 10,197,707 B2 | 2/2019 | Xiao et al. | |
| 10,203,521 B2 | 2/2019 | Pugh et al. | |
| 10,209,534 B2 | 2/2019 | Alli et al. | |
| 10,301,451 B2 | 5/2019 | Jing et al. | |
| 10,465,047 B2 | 11/2019 | Jing et al. | |
| 2004/0141150 A1 | 7/2004 | Roffman et al. | |
| 2009/0091818 A1 | 4/2009 | Haddock et al. | |
| 2010/0076553 A1 | 3/2010 | Pugh et al. | |
| 2011/0157544 A1 | 6/2011 | Pugh et al. | |
| 2012/0140167 A1 | 6/2012 | Blum | |
| 2014/0190004 A1 | 7/2014 | Riall et al. | |
| 2014/0264977 A1 | 9/2014 | Pugh et al. | |
| 2015/0146162 A1* | 5/2015 | Pugh ..................... G02C 7/041 351/159.22 |
| 2017/0312947 A1 | 11/2017 | Pugh et al. | |

FOREIGN PATENT DOCUMENTS

| | | |
|---|---|---|
| TW | 201441022 A | 11/2014 |
| TW | 201501915 A | 1/2015 |

\* cited by examiner

EMBEDDED HYDROGEL CONTACT LENSES

This application claims the benefit under 35 USC § 119 (e) of U.S. provisional application No. 63/169,384 filed on 1 Apr. 2021, incorporated by references in its entirety.

The present invention generally relates to a method for producing embedded hydrogel contact lenses. In addition, the present invention provides embedded hydrogel contact lenses produced according to a method of the invention.

BACKGROUND

Hydrogel contact lenses are widely used for correcting many different types of vision deficiencies due to their softness for wearing comfort. They are made of a hydrated, crosslinked polymeric material that contains from about 20% to about 75% by weight of water within the lens polymer matrix at equilibrium. Hydrogel contact lenses generally are produced according to the conventional full cast-molding process. Such a conventional manufacturing process comprises at least the following steps: lens molding (i.e., curing a polymerizable composition in lens molds), demolding (i.e., removing lenses from molds), extracting lenses with an extraction medium, hydrating lenses, packaging and sterilizing the hydrated lenses. During the lens hydration, the hydrogel contact lenses will absorb water and typically can swell significantly in size.

In recent years, it has been proposed that various inserts can be incorporated in hydrogel contact lenses for various purposes, e.g., for corneal health, vision correction, diagnosis, etc. See, for example, U.S. Pat. Nos. 4,268,132, 4,401,371, 5,098,546, 5,156,726, 6,851,805, 7,104,648, 7,490,936, 7,883,207, 7,931,832, 8,154,804, 8,215,770, 8,348,424, 8,874,182, 8,922,898, 9,155,614, 9,176,332, 9,296,158, 9,618,773, 9,731,437, 9,889,615, 9,977,260, 10,203,521, and 10,209,534; and U.S. Pat. Appl. Pub. Nos. 2004/0141150, 2009/0091818, 2010/0076553, 2011/0157544, and 2012/0140167).

Inserts are typically made of a non-hydrogel material that cannot absorb water and is a non-water-swellable material. One special type of inserts are rigid inserts made of a rigid material (i.e., a highly-crosslinked polymeric material) as rigid center optics for masking astigmatism like a rigid gas permeable (RGP) contact lens. For such inserts, it is expected that there are huge difference in mechanical properties and especially in water-swelling degree between insert material and silicone hydrogel lens material embedding the insert. Due to such huge differences, embedded silicone hydrogel contact lenses are susceptible to lens distortion or especially delamination during the hydration of the hydrogel contact lenses with inserts embedded therein and during the handling and wearing of the embedded silicone hydrogel contact lens. It would be desirable to have embedded silicone hydrogel contact lenses that have rigid hydrophobic inserts therein and not susceptible to delamination.

Furthermore, an insert typically needs to be placed and fixed precisely in a specifically designed position in an embedded hydrogel contact lens. It is a great challenge to produce embedded hydrogel contact lenses that comprise one or more inserts embedded in specific positions in the embedded hydrogel contact lenses.

Therefore, there is still a need for producing embedded hydrogel contact lenses (preferably embedded silicone hydrogel contact lenses) having inserts positioned accurately therein in a relatively efficient and consistent manner and which can be easily implemented in a production environment.

SUMMARY OF THE INVENTION

In some aspects, the invention provides a method for producing embedded hydrogel contact lenses, the method of invention comprising the steps of: (1) obtaining a female mold half, a first male mold half and a second male mold half, wherein the female mold half has a first molding surface defining the anterior surface of a contact lens to be molded, wherein the first male mold half has a second molding surface defining the back surface of an insert to be molded, wherein the second male mold half has a third molding surface defining the posterior surface of the contact lens to be molded, wherein the first male mold half and the female mold half are configured to receive each other such that an insert-molding cavity is formed between the second molding surface and a central portion of the first molding surface when the female mold half is closed with the first male mold half, wherein the second male mold half and the female mold half are configured to receive each other such that a lens-molding cavity is formed between the first and third molding surfaces when the female mold half is closed with the second male mold half; (2) dispensing an amount of an insert-forming composition on the central portion of the first molding surface of the female mold half; (3) placing the first male mold half on top of the insert-forming composition in the female mold half and closing the first male mold half and the female mold half to form a first molding assembly comprising the insert-forming composition within the insert-molding cavity; (4) curing the insert-forming composition in the insert-molding cavity of the first molding assembly to form a molded insert; (5) separating the first molding assembly obtained in step (4) into the first male mold half and the female mold half with the molded insert that is adhered onto the central portion of the first molding surface; (6) dispensing a lens-forming composition in the female mold half with the molded insert adhered thereon in an amount sufficient for filling the lens-molding cavity; (7) placing the second male mold half on top of the lens-forming composition in the female mold half and closing the second male mold half and the female mold half to form a second molding assembly comprising the lens-forming composition and the molded insert immersed therein in the lens-molding cavity; (8) curing the lens-forming composition in the lens-molding cavity of the second molding assembly to form an embedded hydrogel lens precursor that comprise a bulk hydrogel material formed from the lens-forming composition and the insert completely or partially embedded in the bulk material; (9) separating the second molding assembly obtained in step (8) into the second male mold half and the female mold half, with the embedded hydrogel lens precursor adhered on a lens-adhered mold half which is one of the female and second male mold halves; (10) removing the embedded hydrogel lens precursor from the lens-adhered mold half (preferably before the embedded hydrogel lens precursor is contact with water or any liquid); and (11) subjecting the embedded hydrogel lens precursor to post-molding processes including a hydration process and one or more other processes selected from the group consisting of extraction, surface treatment, packaging, sterilization, and combinations thereof.

In other aspects, the invention provides a method for producing embedded hydrogel contact lenses, the method of invention comprising the steps of: (1) obtaining a first female mold half, a male mold half and a second female mold half, wherein the first female mold half has a first molding surface defining the front surface of an insert to be molded, wherein the male mold half has a second molding surface defining the posterior surface of a contact lens to be molded, wherein the second female mold half has a third molding surface defining the anterior surface of the contact lens to be molded, wherein the first female mold half and the male mold half are configured to receive each other such that an insert-molding cavity is formed between the first molding surface and a central portion of the second molding surface when the first female mold half is closed with the male mold half, wherein the second female mold half and the male mold half are configured to receive each other such that a lens-molding cavity is formed between the second and third molding surfaces when the second female mold half is closed with the male mold half; (2) dispensing an amount of an insert-forming composition on the first molding surface of the first female mold half; (3) placing the male mold half on top of the insert-forming composition in the first female mold half and closing the first female mold half and the male mold half to form a first molding assembly comprising the insert-forming composition within the insert-molding cavity; (4) curing the insert-forming composition in the insert-molding cavity of the first molding assembly to form a molded insert; (5) separating the first molding assembly obtained in step (4) into the first female mold half and the male mold half with the molded insert that is adhered onto the central portion of the second molding surface; (6) dispensing a lens-forming composition in the second female mold half in an amount sufficient for filling the lens-molding cavity; (7) placing the male mold half with the molded insert adhered thereon on top of the lens-forming composition in the second female mold half and closing the second female mold half and the male mold half to form a second molding assembly comprising the lens-forming composition and the molded insert immersed therein in the lens-molding cavity; (8) curing the lens-forming composition in the lens-molding cavity of the second molding assembly to form an embedded hydrogel lens precursor that comprise a bulk hydrogel material formed from the lens-forming composition and the insert completely or partially embedded in the bulk material; (9) separating the second molding assembly obtained in step (8) into the second female mold half and the male mold half, with the embedded hydrogel lens precursor adhered on a lens-adhered mold half which is one of the male and second female mold halves; (10) removing the embedded hydrogel lens precursor from the lens-adhered mold half (preferably before the embedded hydrogel lens precursor is contact with water or any liquid); and (11) subjecting the embedded hydrogel lens precursor to post-molding processes including a hydration process and one or more other processes selected from the group consisting of extraction, surface treatment, packaging, sterilization, and combinations thereof.

In other aspects, the invention provides an embedded hydrogel contact lens, comprising: an anterior surface, an opposite posterior surface, a bulk hydrogel material, and an insert completely or partially embedded in the bulk hydrogel material, wherein the insert is made of a polymeric material different from the bulk hydrogel material and has a convex surface, an opposite concave surface and a diameter up to about 13.0 mm, wherein the insert is located in a central portion of the embedded hydrogel contact lens, wherein one of the front and back surfaces of the insert is designated as an exposing surface while the other of the front and back surfaces is designated as a buried surface, wherein the exposing surface merges with or is buried at a depth of less than about 10 microns beneath the anterior or posterior surface the curvature of which in a central zone having a diameter of the insert is substantially identical to the curvature of the exposing surface, the buried surface is buried at a depth of about 20 microns or larger beneath either the anterior or posterior surface, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package and then being stored for at least 3 weeks at 55° C., wherein the packaging solution is a buffered saline having a pH of 7.1±0.2.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
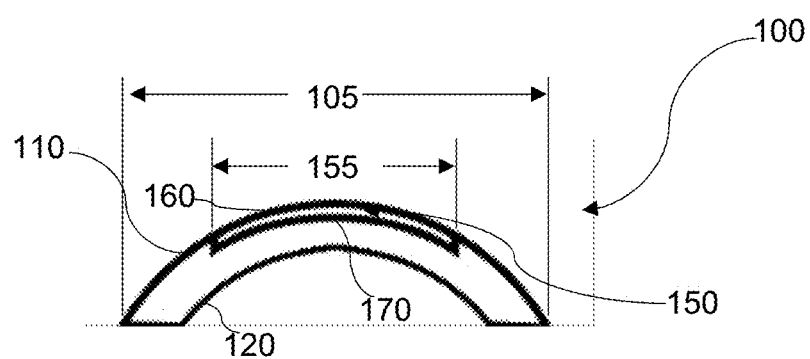
FIG. 1 schematically illustrates an embedded hydrogel contact lens according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

A siloxane, which often also described as a silicone, refers to a molecule having at least one moiety of —Si—O—Si— where each Si atom carries two organic groups as substituents.

As used in this application, the term "non-silicone hydrogel" or "non-silicone hydrogel material" interchangeably refers to a hydrogel that is theoretically free of silicon.

An "embedded hydrogel contact lens" refers a hydrogel contact lens comprising at least one insert which is embedded within the bulk hydrogel material of the embedded hydrogel contact lens to an extend that at most one of the anterior or posterior surfaces of the insert can be exposed fully or partially. It is understood that the material of the insert is different from the bulk hydrogel material of the embedded hydrogel contact lens.

An "insert" refers to any 3-dimensional article which has a dimension of at least 5 microns but is smaller in dimension sufficient to be embedded in the bulk material of an embedded hydrogel contact lens and which is made of a material (preferably a non-hydrogel material) that is different from the bulk hydrogel material.

In accordance with the invention, a non-hydrogel material can be any material that can absorb less than 5% (preferably about 4% or less, more preferably about 3% or less, even more preferably about 2% or less) by weight of water when being fully hydrated.

In accordance with the invention, an insert of the invention has a thickness less than any thickness of an embedded hydrogel contact lens in the region where the insert is embedded. An insert can be any object have any geometrical shape and can have any desired functions. Examples of preferred inserts include without limitation thin rigid inserts for providing rigid center optics for masking astigmatism like a rigid gas permeable (RGP) contact lens, multifocal lens inserts, photochromic inserts, cosmetic inserts having color patterns printed thereon, etc.

"Hydrophilic," as used herein, describes a material or portion thereof that will more readily associate with water than with lipids.

"Hydrophobic" in reference to an insert material or insert that has an equilibrium water content (i.e., water content in fully hydrated state) of less than 5% (preferably about 4% or less, more preferably about 3% or less, even more preferably about 2% or less).

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

The term "ethylenically unsaturated group" is employed herein in a broad sense and is intended to encompass any groups containing at least one >C=C<group. Exemplary ethylenically unsaturated groups include without limitation (meth)acryloyl

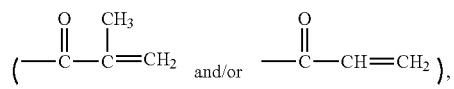

vinyloxycarbonylamino

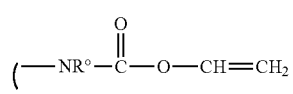

in which R° is H or $C_1$-$C_4$ alkyl), vinyloxycarbonyloxy

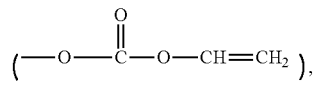

vinylaminocarbonylamino

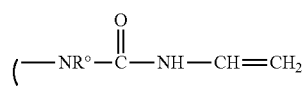

in which R° is H or $C_1$-$C_4$ alkyl), vinylaminocarbonyloxy

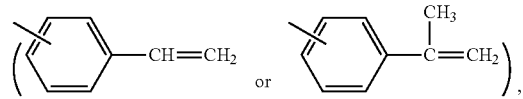

allyl, vinyl, styrenyl

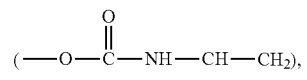

or other C=C containing groups.

An "acrylic monomer" refers to a vinylic monomer having one sole (meth)acryloyl group. Examples of acrylic monomrs includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

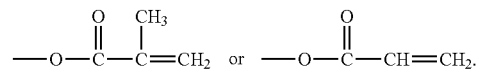

An "(meth)acrylamido monomer" refers to a vinylic monomer having one sole group of

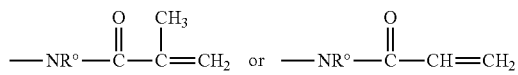

in which R° is H or $C_1$-$C_4$ alkyl.

The term "aryl acrylic monomer" refers to an acrylic monomer having at least one aromatic ring.

An "(meth)acryloxy monomer" or "(meth)acryloyloxy monomer" refers to a vinylic monomer having one sole group of

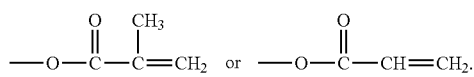

An "(meth)acrylamido monomer" refers to a vinylic monomer having one sole group of

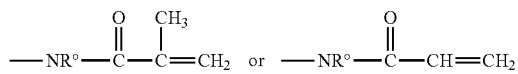

in which R° is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

An "ene monomer" refers to a vinylic monomer having one sole ene group.

The term "ene group" refers to a monovalent radical of $CH_2$=CH— or $CH_2$=$CCH_3$— that is not covalently attached to an oxygen or nitrogen atom or a carbonyl group.

A "hydrophilic vinylic monomer" refers to a vinylic monomer which typically yields a homopolymer that is water-soluble or can absorb at least 10 percent by weight of water.

A "hydrophobic vinylic monomer" refers to a vinylic monomer which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); $^1$H NMR (Proton nuclear magnetic resonance) spectroscopy, etc.

A "polysiloxane segment" or "polydiorganosiloxane segment" interchangeably refers to a polymer chain segment (i.e., a divalent radical) of

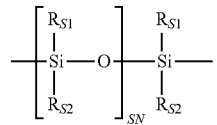

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—OR°(in which alk is $C_1$-$C_6$ alkylene diradical, R° is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}$'), amino linkages of —$NR_{N1}$—, amide linkages of —$CONR_{N1}$—, amide of —$CONR_{N1}R_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

The intrinsic "oxygen permeability", $Dk_i$, of a material is the rate at which oxygen will pass through a material. Oxygen permeability is conventionally expressed in units of barrers, where "barrer" is defined as $[(cm^3 \text{ oxygen})(mm)/(cm^2)(sec)(mm\ Hg)] \times 10^{-10}$.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)] \times 10^{-9}$.

The "ion permeability" through a lens correlates with the Ionoflux Diffusion Coefficient. The Ionoflux Diffusion Coefficient, D (in units of [mm$^2$/min]), is determined by applying Fick's law as follows:

$$D = -n'/(A \times dc/dx)$$

where n'=rate of ion transport [mol/min]; A=area of lens exposed [mm$^2$]; dc=concentration difference [mol/L]; dx=thickness of lens [mm].

The term "modulus" or "elastic modulus" in reference to a contact lens or a material means the tensile modulus or Young's modulus which is a measure of the stiffness of a contact lens or a material. The modulus can be measured according to the procedures described in Example 1.

An "unprocessed state" refers to an insert or contact lens which is obtained by cast-molding of a polymerizable composition in a mold and has not been subjected to extraction and/or hydration post-molding processes (i.e., having not been in contact with water or any organic solvent or any liquid after molding).

A "male mold half" or "base curve mold half" interchangeably refers to a mold half having a molding surface that is a substantially convex surface and that defines the posterior surface of a contact lens or an insert.

A "female mold half" or "front curve mold half" interchangeably refers to a mold half having a molding surface that is a substantially concave surface and that defines the anterior surface of a contact lens or an insert.

The term "anterior surface", "front surface", "front curve surface" or "FC surface" in reference to a contact lens or an insert, as used in this application, interchangeably means a surface of the contact lens or insert that faces away from the eye during wear. The anterior surface (FC surface) is convex.

The "posterior surface", "back surface", "base curve surface" or "BC surface" in reference to a contact lens or insert, as used in this application, interchangeably means a surface of the contact lens or insert that faces towards the eye during wear. The posterior surface (BC surface) is concave.

Figure 2:
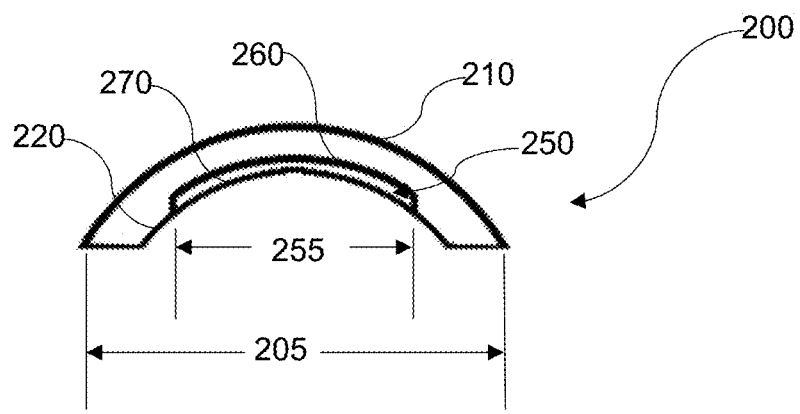
FIG. 2 schematically illustrates an embedded hydrogel contact lens according to a preferred embodiment of the invention.

In general, the invention is directed to a 3-mold halves-molding method for producing embedded hydrogel contact lenses, in particular, embedded silicone hydrogel contact lenses, as schematically illustrated in FIG. 1 or 2.

The conventional cast molding methods typically involve two pairs of mold halves for molding embedded hydrogel contact lenses, the first pair for molding inserts and the second pair for molding embedded hydrogel contact lenses each including an insert preformed using the first pair of mold halves. In contrast, a method of the invention involves a set of three mold halves, which can: either (1) consist of one female mold half having a molding surface defining the anterior surface of a hydrogel contact lens to be molded, one first male mold half having a molding surface defining the posterior surface of an insert to be molded, and one second male mold half having a molding surface defining the posterior surface of the hydrogel contact lens to be molded; or (2) consist of one first female mold half having a molding surface defining the anterior surface of an insert to be molded, one male mold half having a molding surface defining the posterior surface of a contact lens to be molded, and one second female mold half having a molding surface defining the anterior surface of the hydrogel contact lens to be molded.

For a 2-pairs-molding process, an insert is curing in the first pair of mold halves, then demolded (i.e., separating mold halves with the molded insert adhered on one of the mold halves), and finally removed (i.e., de-insert) from the insert-adhered mold half to form a preformed insert to be used in subsequent molding of an embedded hydrogel contact lens. The preformed insert needs to be meticulously positioned and fixed on the molding surface of one (e.g., female mold half) of the second pair of mold halves by using various means, such as, positioning guides, and/or multi-steps of curing. Positioning guides can leave voids in a molded embedded hydrogel contact lens and those voids are susceptible to bioburden trapping and may not cosmetically acceptable to patients. Such a 2-pairs-molding process may not be easily implemented in an automatic production to ensure the proper positioning of the insert during molding process.

The present invention is partly based on the finding that a special set of three mold halves can be used to solve the problem encountered in a 2-pairs-molding method in precisely positioning of preformed inserts during lens molding process. The special set of three mold halves consists of: one female lens mold half having a molding surface defining the anterior surface of a hydrogel contact lens; one male lens mold half having a molding surface defining the posterior surface of the hydrogel contact lens; and an insert mold half having a molding surface defining one of the anterior and posterior surfaces of an insert. One unique feature is that one of the female and male lens mold halves needs to be used two times: the first time for molding an insert during first curing process and the other time for molding an embedded hydrogel contact lens with the molded insert embedded partially or fully therein during second curing process. The insert mold half needs to be configured to mate with the twice-used lens mold half to form a cavity for molding an insert. The twice-used lens mold half and/or demolding process (i.e., a process for separating the twice-used lens mold half and the insert mold half) are designed to ensure that the molded insert is adhered onto the molding surface of the twice-used lens mold half. By using a special set of three mold halves and by eliminating the step of removing inserts from insert-adhered mold halves, the accurately positioning of inserts during molding in a method of the invention can be achieved.

A method of the invention can offer the following advantages. First, no guide for centrally positioning an insert is required during molding process. By eliminating positioning guides, any small voids in the lenses from the positioning guides are eliminated, thus removing any potential for bioburden trapping. Further, one mold half for molding an insert is eliminated, saving the costs associated with that mold half. In addition, a method of the invention can be easily implemented in an automatic product line for producing embedded hydrogel contact lenses in mass.

FIG. 1 schematically illustrates a cross-sectional view of an embedded hydrogel contact lens according to an embodiment of the invention. An embedded hydrogel contact lens 100 comprises an anterior surface 110, an opposite posterior surface 120, and an insert 150 and has a diameter 105 large than to cover the cornea of a human eye. The insert 150 is made of a polymeric material different from the polymeric material of the remaining part of the embedded hydrogel contact lens 100 and comprises an anterior surface 160 and an opposite posterior surface 170. The insert 150 has a diameter 155 sufficient small so as to be located within the optical zone of the embedded hydrogel contact lens 100. According to this preferred embodiment, the anterior surface 160 of the insert 150 has a curvature substantially identical to the curvature of the anterior surface 110 of the embedded hydrogel contact lens, and can substantially merges with the anterior surface 110 of the embedded hydrogel contact lens 100 or be buried beneath the anterior surface 110 of the embedded hydrogel contact lens 100 at a depth of less than 10 microns (preferably excluding any coating on the embedded hydrogel contact lens 100).

FIG. 2 schematically illustrates a cross-sectional view of an embedded hydrogel contact lens according to another embodiment of the invention. An embedded hydrogel contact lens 200 comprises an anterior surface 210, an opposite posterior surface 220, and an insert 250 and has a diameter 205 large than to cover the cornea of a human eye. The insert 250 is made of a polymeric material different from the polymeric material of the remaining part of the embedded hydrogel contact lens 200 and comprises an anterior surface 260 and an opposite posterior surface 270. The insert 250 has a diameter 255 sufficient small so as to be located within the optical zone of the embedded hydrogel contact lens 200. According to this preferred embodiment, the posterior surface 270 of the insert 250 has a curvature substantially identical to the curvature of the posterior surface 220 of the embedded hydrogel contact lens, and can substantially merges with the posterior surface 220 of the embedded contact lens 200 or be buried beneath the posterior surface 220 of the embedded hydrogel contact lens 200 at a depth of less than 10 microns (preferably excluding any coating on the embedded hydrogel contact lens 200).

The present invention provides, in one aspect, a method for producing embedded hydrogel contact lenses, comprising the steps of: (1) obtaining a female mold half, a first male mold half and a second male mold half, wherein the female mold half has a first molding surface defining the anterior surface of a contact lens to be molded, wherein the first male mold half has a second molding surface defining the back surface of an insert to be molded, wherein the second male mold half has a third molding surface defining the posterior surface of the contact lens to be molded, wherein the first male mold half and the female mold half are configured to receive each other such that an insert-molding cavity is formed between the second molding surface and a central portion of the first molding surface when the female mold half is closed with the first male mold half, wherein the second male mold half and the female mold half are configured to receive each other such that a lens-molding cavity is formed between the first and third molding surfaces when the female mold half is closed with the second male mold half; (2) dispensing an amount of an insert-forming composition on the central portion of the first molding surface of the female mold half; (3) placing the first male mold half on top of the insert-forming composition in the female mold half and closing the first male mold half and the female mold half to form a first molding assembly comprising the insert-forming composition within the insert-molding cavity; (4) curing the insert-forming composition in the insert-molding cavity of the first molding assembly to form a molded insert; (5) separating the first molding assembly obtained in step (4) into the first male mold half and the female mold half with the molded insert that is adhered onto the central area of the first molding surface; (6) dispensing a lens-forming composition in the female mold half with the molded insert adhered thereon in an amount sufficient for filling the lens-molding cavity; (7) placing the second male mold half on top of the lens-forming composition in the female mold half and closing the second male mold half and the female mold half to form a second molding assembly comprising the lens-forming composition and the molded insert immersed therein in the lens-molding cavity; (8) curing the lens-forming composition in the lens-molding cavity of the second molding assembly to form an embedded hydrogel lens precursor that comprises a bulk hydrogel material formed from the lens-forming composition and the insert completely or partially embedded in the bulk material; (9) separating the second molding assembly obtained in step (8) into the second male mold half and the female mold half, with the embedded hydrogel lens precursor adhered on a lens-adhered mold half which is one of the female and second male mold halves; (10) removing the embedded hydrogel lens precursor from the lens-adhered mold half (preferably before the embedded hydrogel lens precursor is contact with water or any liquid); and (11) subjecting the embedded hydrogel lens precursor to post-molding processes including a hydration process and one or more other processes selected from the group consisting of extraction, surface treatment, packaging, sterilization, and combinations thereof. Preferably, the front surface of the insert merges with or is buried at a depth of less than about 10 microns beneath the anterior surface of the contact lens, and the curvature of the front surface of the insert is identical to the curvature of a central zone, which has a diameter of the insert, of the anterior surface of the contact lens.

In other aspects, the invention provides a method for producing embedded hydrogel contact lenses, the method of invention comprising the steps of: (1) obtaining a first female mold half, a male mold half and a second female mold half, wherein the first female mold half has a first molding surface defining the front surface of an insert to be molded, wherein the male mold half has a second molding surface defining the posterior surface of a contact lens to be molded, wherein the second female mold half has a third molding surface defining the anterior surface of the contact lens to be molded, wherein the first female mold half and the male mold half are configured to receive each other such that an insert-molding cavity is formed between the first molding surface and a central portion of the second molding surface when the first female mold half is closed with the male mold half, wherein the second female mold half and the male mold half are configured to receive each other such that a lens-molding cavity is formed between the second and third molding surfaces when the second female mold half is closed with the male mold half; (2) dispensing an amount of an insert-forming composition on the first molding surface of the first female mold half; (3) placing the male mold half on top of the insert-forming composition in the first female mold half and closing the first female mold half and the male mold half to form a first molding assembly comprising the insert-forming composition within the insert-molding cavity; (4) curing the insert-forming composition in the insert-molding cavity of the first molding assembly to form a molded insert; (5) separating the first molding assembly obtained in step (4) into the first female mold half and the male mold half with the molded insert that is adhered onto the central portion of the second molding surface; (6) dispensing a lens-forming composition in the second female mold half in an amount sufficient for filling the lens-molding cavity; (7) placing the male mold half with the molded insert adhered thereon on top of the lens-forming composition in the second female mold half and closing the second female mold half and the male mold half to form a second molding assembly comprising the lens-forming composition and the molded insert immersed therein in the lens-molding cavity; (8) curing the lens-forming composition in the lens-molding cavity of the second molding assembly to form an embedded hydrogel lens precursor that comprises a bulk hydrogel material formed from the lens-forming composition and the insert completely or partially embedded in the bulk material; (9) separating the second molding assembly obtained in step (8) into the second female mold half and the male mold half, with the embedded hydrogel lens precursor adhered on a lens-adhered mold half which is one of the male and second female mold halves; (10) removing the embedded hydrogel lens precursor from the lens-adhered mold half (preferably before the embedded hydrogel lens precursor is contact with water or any liquid); and (11) subjecting the embedded hydrogel lens precursor to post-molding processes including a hydration process and one or more other processes selected from the group consisting of extraction, surface treatment, packaging, sterilization, and combinations thereof. Preferably, the back surface of the insert merges with or is buried at a depth of less than about 10 microns beneath the posterior surface of the contact lens, and the curvature of the back surface of the insert is identical to the curvature of a central zone, which has a diameter of the insert, of the posterior surface of the contact lens.

Mold halves for making contact lenses (or inserts) are well known to a person skilled in the art and, for example, are employed in cast molding. In general, a molding assembly comprises at least two mold halves, one male half and one female mold half. The male mold half has a first molding (or optical) surface which is in direct contact with a polymerizable composition for cast molding of a contact lens (or an insert) and defines the posterior (back) surface of a molded contact lens (or a molded insert); and the female mold half has a second molding (or optical) surface which is in direct contact with the polymerizable composition and defines the anterior (front) surface of the molded contact lens (or molded insert). The male and female mold halves are configured to receive each other such that a lens- or insert-forming cavity is formed between the first molding surface and the second molding surface.

In a preferred embodiment, the mold half having a molding surface defining one of the anterior (front) and posterior (back) surfaces of the insert comprise an overflow groove which surrounds the molding surface and receives any excess insert-forming material when the molding assembly is closed. By having such an overflow groove, one can ensure that any flushes formed from the excess insert-forming material during molding of the insert can be stuck on the mold half having a molding surface defining the anterior (front) or posterior (back) surface of the insert during the step of separating the molding assembly halves, thereby removing the flushes.

Methods of manufacturing mold halves for cast-molding a contact lens or an insert are generally well known to those of ordinary skill in the art. The process of the present invention is not limited to any particular method of forming a mold half. In fact, any method of forming a mold half can be used in the present invention. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making mold halves can be used to make mold halves for making contact lenses or inserts. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used.

In accordance with the invention, an insert-forming composition and a lens-forming composition are polymerizable compositions that are different from each other. They can differ from each other in the presence or absence of one or more polymerizable components, in the amounts of one or more polymerizable components, and/or in the presence or absence of one or more non-leachable additives for providing different optical properties (e.g., photochromic dyes or pigments, UV-absorbing materials, HEVL-absorbing materials, fluorescent dyes or pigments, color-filtering materials for correcting color blindness, diffractive materials, high refractive-index materials, etc.).

In a preferred embodiment, the insert-forming composition is a polymerizable composition comprising at least one polymerizable photochromic compound (i.e., at least one photochromic vinylic monomer), at least UV-absorbing vinylic monomer, at least one HEVL-absorbing vinylic monomer, a fluorescent vinylic monomer, or combinations thereof.

In another preferred embodiment, the insert-forming composition is a polymerizable composition comprising at least one photochromic dye or pigment, at least one color-filtering material for correcting color blindness, a diffractive material, a high refractive-index material, or combinations.

In another preferred embodiment, the insert-forming composition is a polymerizable composition for forming a hydrophobic insert, preferably a hydrophobic rigid insert, even more preferably a rigid gas-permeable insert.

In accordance with the invention, the lens-forming composition is a hydrogel lens-forming composition, preferably a silicone hydrogel lens-forming composition.

Any polymerizable compositions can be used as insert-forming composition.

Preferably, a polymerizable composition for forming an insert comprises at least about 55% (preferably at least about 60%, more preferably at least about 65% even more preferably at least about 70%) by mole of one or more acrylic monomers and/or one or more acrylic crosslinker or crosslinking agent and at least about 6% by mole (preferably at least about 8% by mole, more preferably at least about 10% by mole, even more preferably at least about 12% by mole) of at least one vinylic crosslinking agent. It is understood that acrylic monomers and/or crosslinkers are required for providing H-bond acceptors (ester and/or amide bonds) to the crosslinked polymeric material of the hydrophobic insert of the embedded hydrogel contact lens.

Any hydrophobic acrylic monomers can be used in forming a rigid hydrophobic insert of the inventions. Examples of hydrophobic acrylic monomers includes silicone-containing acrylic monomers (any one of those described below in this application), non-silicone hydrophobic acrylic monomers (any one of those described below in this application), fluorine-containing acrylic monomers (any one of those described below in this application), aryl acrylic monomers as described below, and combinations thereof.

In accordance with a preferred embodiment of the invention, the crosslinked polymeric material of the rigid hydrophobic insert comprises an aryl vinylic monomer of formula (I) or (II)

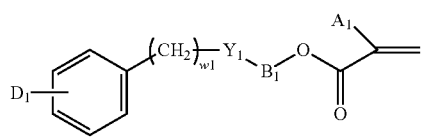

(I)

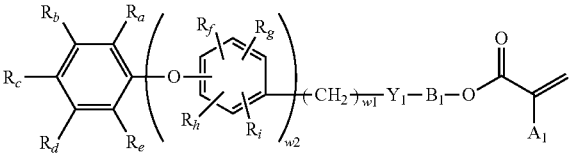

(II)

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_nH_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

Examples of aryl acrylic monomers of formula (I) include, but are not limited to: 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl) ethyl methacrylate; 2-(4-propylphenyl)ethyl acrylate; 2-(4-propylphenyl)ethyl methacrylate; 2-(4-(1-methylethyl) phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl) ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy) ethoxy]ethyl methacrylate; or combinations thereof. The above listed aryl acrylic monomers of formula (I) can be obtained from commercial sources or alternatively prepared according to methods known in the art.

Preferred aryl acrylic monomers of formula (I) are those wherein B1 is $OCH_2CH_2$, $(OCH_2CH_2)_2$, $(OCH_2CH_2)_3$, or $(CH_2)_{m1}$ in which m1 is 2-5, $Y_1$ is a direct bond or O, w1 is 0 or 1, and $D_1$ is H. Most preferred are 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; and their corresponding methacrylates.

Aryl acrylic monomers of formula (II) can be prepared from monofunctional polyphenyl ethers (i.e., ones with one functional group such as hydroxyl, amino, or carboxyl groups). Generally, a monofunctional OH-terminated poly (phenyl ether) is reacted with a (meth)acrylic acid derivative (such as acryloyl chloride, methacryloyl chloride, methacrylic anhydride, or an isocyanatoalkyl acrylate or methacrylate) under coupling reaction conditions known to a person skilled in the art. Mono-amine and mono-carboxylic acid terminated polyphenyl ethers are functionalized in a similar manner using suitable (meth)acrylic acid derivatives. Monofunctional terminated polyphenyl ethers can be prepared according to procedures described in literature (*J. Org. Chem.*, 1960, 25 (9), pp 1590-1595). The experiment procedures for preparing aryl acrylic monomers of formula (II) can be found in U.S. patent Ser. No. 10/064,977.

It is also understood that any hydrophobic vinylic monomer can be used as a substitute for a hydrophobic acrylic monomer, so long as it comprises at least one H-bond acceptor such as ester bond, amide bond, carbonate bond, carbamate bond, ether bond, or combinations thereof. Examples of such hydrophobic monomers include vinyl alkanoates (any one of those described above in this application), vinyloxyalkanes (any one of those described above in this applicaiton), and combinations thereof.

It is understood that the mole percentages of each of the components of the crosslinked polymeric material of an insert of the invention can be obtained based on the mole percentages of its corresponding polymerizable component (material) in a polymerizable composition for making the insert.

In accordance with the invention, a polymerizable composition for forming a hydrophobic insert comprises at least one vinylic crosslinking agent. Any suitable vinyl crosslinking agents can be used in the invention. Examples of preferred vinylic crosslinking agents include without limitation: acrylic crosslinking agents (crosslinkers) as described below, allyl methacrylate, allyl acrylate, an aryl crosslinking agent (e.g., divinylbenzene, 2-methyl-1,4-divinylbenzene, bis(4-vinylphenyl)methane, 1,2-bis(4-vinylphenyl)ethane, etc.), triallyl isocyanurate, 2,4,6-triallyloxy-1,3,5-triazine, 1,2,4-trivinylcyclohexane, or combinations thereof. It is understood that vinylic crosslinking agents are required for imparting the desired rigidity to the crosslinked polymeric material of the rigid hydrophobic insert.

Examples of acrylic crosslinking agents include without limitation ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl)isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

In a preferred embodiment, the polymerizable composition for forming hydrophobic insert comprises at least one acrylic crosslinking agent (any one of those described above).

In another preferred embodiment, the polymerizable composition for forming hydrophobic insert comprises at least one aryl crosslinking agent (any one of those described above).

In another preferred embodiment, the polymerizable composition for forming hydrophobic insert comprises at least one vinyl-functional polysiloxane that comprises at least two vinyl groups each directly attached to one silicon atom and at least 15% by mole of siloxane units each having at least one phenyl substituent.

Examples of such vinyl functional polysiloxanes include without limitation vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), vinyl terminated diphenylsiloxane-dimethylsiloxane copolymers (e.g., PDV-1625 from Gelest), or combinations thereof. Preferably, the vinyl-functional polysiloxane is vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), or combinations thereof.

In accordance with the invention, a polymerizable composition for forming a hydrophobic insert can further comprise at least one UV-absorbing vinylic monomer (any one of those described later in this application), at least one UV/HEVL-absorbing vinylic monomer (any one of those described later in this application, at least one photochromic vinylic monomer (any one of those described later in this application, or combinations thereof.

A polymerizable composition for making hydrophobic inserts can be prepared by mixing all polymerizable materials as described above in the desired proportions, together with one or more polymerization initiators (thermal polymerization initiators or photoinitiators) in the presence or preferably in the absence of a non-reactive organic solvent (i.e., a non-reactive diluent) as described later in this application.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-050), 2,4-pentanedione peroxide, dicumyl peroxide, peracetic acid, potassium persulfate, sodium persulfate, ammonium persulfate, 2,2'-azobis(4-methoxy-2,4-di methylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile)

(VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

In a preferred embodiment, the lens-forming composition is a non-silicone hydrogel lens-forming composition (or non-silicone hydrogel lens film formulation) which is either (1) a monomer mixture comprising (a) at least one hydrophilic vinylic monomer (e.g., hydroxyl-containing vinylic monomer, N-vinylpyrrolidone, or combinations thereof) and (b) at least one component selected from the group consisting of a crosslinking agent, a hydrophobic vinylic monomer, a free-radical initiator (photoinitiator or thermal initiator), a UV-absorbing vinylic monomer, a high-energy-violet-light ("HEVL") absorbing vinylic monomer, a visibility tinting agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent, and combinations thereof.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A. They can be used as a lens-forming composition of the invention.

Preferably, non-silicone hydrogel lens-forming composition comprises at least 50% by mole of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, and vinyl alcohol.

In another preferred embodiment, a lens-forming composition is a silicone hydrogel lens-forming composition (i.e. a silicone hydrogel lens formulation). Numerous silicone hydrogel lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. They can be used as a lens-forming composition of the invention.

Preferably, a silicone hydrogel lens-forming composition comprises (a) at least one first polysiloxane vinylic crosslinker comprising hydrophilized siloxane units each having one methyl substituent and one organic radical including at least one H-bond donor (preferably hydroxyl groups) and (b) at least one hydrophilic vinylic monomer, wherein the content of said at least one H-bond donor is at least about 0.8 meq/g (preferably at least about 1.0 meq/g, more preferably at least about 1.2 meq/g, even more preferably at least about 1.4 meq/g) relative to the molecular weight of said at least one first polysiloxane vinylic crosslinker.

In accordance with the invention, any polysiloxane vinylic crosslinkes can be used in the invention as the first polysiloxane vinylic crosslinkers, so long as they comprises hydrophilized siloxane units each having one methyl substituent and one organic radical having at least one H-bond donor (preferably hydoxyl group). Examples of a class of preferred polysiloxane vinylic crosslinkers are di-(meth) acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (G), as described later in this application. They can be prepared according to the procedures disclosed in U.S. patent Ser. No. 10/081,697.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

In accordance with the invention, the silicone hydrogel lens-forming composition can further comprise a silicone-containing vinylic monomer and/or a second polysiloxane vinylic crosslinker (other than the first polysiloxane vinylic crosslinker).

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, 3-methacryloxypropyl pentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166,236, 6,867,245, 8,415,405, 8,475,529, 8,614,261, and 9,217,813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention as the second polysiloxane vinylic crosslinkers. Examples of preferred polysiloxane vinylic crosslinkers as the second polysiloxane vinylic crosslinker are di-(meth)acryloyl-terminated polydimethyl-siloxanes; di-vinyl carbonate-terminated polydimethylsiloxanes; di-vinyl carbamate-terminated polydimethylsiloxane; N, N, N′,N′-tetrakis(3-methacryloxy-2-hydroxypropyl)-alpha, omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers as the second polysiloxane vinylic crosslinker are vinylic crosslinkers each of which comprises one sole polydiorganosiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers as the second polysiloxane vinylic crosslinker are chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 10301451, and 10465047.

In accordance with the invention, the silicone hydrogel lens-forming composition can also comprise one or more hydrophobic non-silicone vinylic monomers. Examples of preferred hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, etc.), fluorine-containing acrylic monomers (e.g., perfluorohexylethyl-thio-carbonyl-aminoethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isoputyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth)acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, and combinations thereof.

In accordance with the invention, the silicone hydrogel lens-forming composition can also comprise one or more non-silicone vinylic crosslinkers. Examples of preferred non-silicone vinylic cross-linking agents are described later in this application.

In accordance with the invention, the silicone hydrogel lens-forming composition can also comprises repeating units of other polymerizable materials, such as, a UV-absorbing vinylic monomer, a UV/high-energy-violet-light ("HEVL") absorbing vinylic monomer, polymerizable photochromic compound, a polymerizable tinting agent (polymerizable dye), or combinations thereof, as known to a person skilled in the art.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'[3'-methacryloyloxypropoxy]phenyl}-2H-benzotriazole, 2-{2'-Hydroxy-3'-tert-butyl-5'[3'-methacryloyloxypropoxy]phenyl}-5-methoxy-2H-benzotriazole (UV13), 2-{2'-Hydroxy-3'-tert-butyl-5'[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (901) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline) pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

In a preferred embodiment, the silicone hydrogel lens-forming composition comprises at least about 5% (preferably at least about 10%, more preferably at least about 15%, even more preferably at least about 20%, most preferably at least about 25%) by weight of the first polysiloxane vinylic crosslinker.

In accordance with the invention, the silicone hydrogel material of the embedded silicone hydrogel contact lens has an equilibrium water content (i.e., in fully hydrated state or when being fully hydrated) of from about 20% to about 70% (preferably from about 20% to about 65%, more preferably from about 25% to about 65%, even more preferably from about 30% to about 60%) by weight, an oxygen permeability of at least about 40 barrers (preferably at least about 60 barrers, more preferably at least about 80 barrers, more preferably at least about 100 barrers), and a modulus (i.e., Young's modulus) of about 1.5 MPa or less (preferably from about 0.2 MPa to about 1.2 MPa, more preferably from about 0.3 MPa to about 1.1 MPa, even more preferably from about 0.4 MPa to about 1.0 MPa).

A lens-forming composition or an insert-forming composition can be a solventless clear liquid prepared by mixing all polymerizable components (or materials) and other necessary component (or materials) or a solution prepared by dissolving all of the desirable components (or materials) in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction (any of those solvents as described later in this application).

A solventless lens SiHy lens formulation (silicone hydrogel lens-forming composition) typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Examples of suitable solvents include acetone, methanol, cyclohexane, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. More preferred organic solvents include without limitation methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, di methylcyclopentane (various isomers), 2,2,4-trimethylpentane, and mixtures thereof.

The insert-forming composition and the lens-forming composition can be introduced into the insert-molding cavity and the lens-molding cavity respectively according any techniques known to a person skilled in the art.

When the first molding assembly is closed, any excess insert-forming composition is pressed into an overflow groove provided on the insert mold half (i.e., the first male mold half having a second molding surface defining the posterior surface of an insert to be molded or the first female mold half having a first molding surface defining the anterior surface of an insert to be molded).

When the second molding assembly is closed, any excess lens-forming composition is pressed into an overflow groove provided on either one of the two mold halves each having a molding surface defining one of the anterior and posterior surfaces of a contact lens to be molded. The overflow groove surrounds the molding surface defining one of the anterior and posterior surfaces of a contact lens to be molded.

The curing of the insert-forming composition within the insert-molding cavity of the closed first molding assembly and the lens-forming composition within the lens-molding cavity of the closed second molding assembly can be carried out thermally (i.e., by heating) or actinically (i.e., by actinic radiation, e.g., UV radiation and/or visible radiation) to activate the polymerization initiators.

The actinic polymerization of the insert- or lens-forming composition in a molding assembly can be carried out by irradiating the closed molding assembly with the insert- or lens-forming composition therein with an UV or visible light, according to any techniques known to a person skilled in the art.

The thermal polymerization of the insert- or lens-forming composition in a molding assembly can be carried out conveniently in an oven at a temperature of from 25 to 120° C. and preferably 40 to 100° C., as well known to a person skilled in the art. The reaction time may vary within wide limits, but is conveniently, for example, from 1 to 24 hours or preferably from 2 to 12 hours. It is advantageous to previously degas the silicone-hydrogel-lens-forming composition and to carry out said copolymerization reaction under an inert atmosphere, e.g., under $N_2$ or Ar atmosphere.

The step of separating the first molding assembly can be carried out according to any techniques known to a person skilled in the art. It is understood that the molded insert is adhered onto the female mold having a molding defining the anterior surface of a contact lens to be molded (in one aspect) or onto the male mold have a molding surface defining the posterior surface of a contact lens to be molded (in another aspect). Many techniques are known in the art. For example, the molding surface of the mold half designed to adhere the molded insert can be surface-treated to render the molded insert preferentially adhered to the molding surface of this mold half. Alternatively, a compression force can be applied by using a mold-opening device to non-optical surface (opposite to the molding surface) of the mold half (not adhering the molded insert) of the first molding assembly at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the mold half, thereby breaking bonds between the molding surface of the mold half and the molded insert. Various ways of applying a force to non-optical surface of the mold half at a location about the center area of non-optical molding surface along the axis of the mold to deform the mold half which breaks the bonds between the optical molding surface of the mold half and the molded insert. It is understood that the mold-opening device can have any configurations known to a person skilled in the art for performing the function of separating two mold halves from each other.

Similarly, the step of separating the second molding assembly can be carried out according to any techniques known to a person skilled in the art. It is understood that the molded embedded hydrogel contact lens can be adhered onto either one of the two mold halves of the second molding assembly.

The embedded hydrogel lens precursor can be delensed (i.e., removed) from the lens-adhered mold half according to any techniques known to a person skilled in the art.

After the embedded hydrogel lens precursor is delensed, it typically is extracted with an extraction medium as well known to a person skilled in the art. The extraction liquid medium is any solvent capable of dissolving the diluent(s), unpolymerized polymerizable materials, and oligomers in the embedded hydrogel lens precursor. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted embedded hydrogel contact lens can then be hydrated according to any method known to a person skilled in the art.

The hydrated embedded hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

The invention provides, in other aspects, an embedded hydrogel contact lens, comprising: an anterior surface, an opposite posterior surface, a bulk hydrogel material, and an insert completely or partially embedded in the bulk hydrogel material, wherein the insert is made of a polymeric material different from the bulk hydrogel material and has a convex surface, an opposite concave surface and a diameter up to about 13.0 mm, wherein the insert is located in a central portion of the embedded hydrogel contact lens, wherein one of the convex and concave surfaces of the insert is designated as an exposing surface while the other of the convex and concave surfaces is designated as a buried surface, wherein the exposing surface merges with or is buried at a depth of less than about 10 microns beneath the anterior or posterior surface the curvature of which in a central zone having a diameter of the insert is substantially identical to the curvature of the exposing surface, wherein the buried surface is buried at a depth of at least about 20 microns beneath either the anterior surface or the posterior surface, wherein the embedded hydrogel contact lens is not susceptible to delamination as demonstrated by being free of bubble when being inspected under microscopy at interfaces between the insert and the bulk material within the embedded hydrogel contact lens after being autoclaved in a packaging solution in a sealed package and then being stored for at least 3 weeks at 55° C., wherein the packaging solution is a phosphate buffered saline having a pH of 7.1±0.2.

The term "substantially identical" in reference to two curvatures means that they differ from each other by about 10% or less.

In some preferred embodiments, the insert is a hydrophobic insert (preferably a hydrophobic rigid insert, even more preferably a rigid gas-permeable insert) (any one of those described above).

In some preferred embodiments, the bulk hydrogel material is a silicone hydrogel material (any one of those described above).

In accordance with the invention, the hydrophobic insert is made of any crosslinked polymeric material that has an equilibrium water content of less than 5% (preferably about 4% or less, more preferably about 3% or less, even more preferably about 2% or less) by weight and comprises at least 55% (preferably at least about 60%, more preferably at least about 65% even more preferably at least about 70%) by mole of repeating units of one or more acrylic monomers and/or one or more acrylic crosslinker or crosslinking agent and at least about 6% by mole of repeating units of at least one vinylic crosslinking agent. It is understood that the mole percentages of each of the components of the crosslinked polymeric material of an insert of the invention can be obtained based on the mole percentages of its corresponding polymerizable component (material) in a polymerizable composition for making the insert.

In a preferred embodiment, the crosslinked polymeric material of the rigid hydrophobic insert comprises repeating units of at least one acrylic crosslinking agent (any one of those described above).

In another preferred embodiment, the crosslinked polymeric material of the rigid hydrophobic insert comprises repeating units of at least one aryl crosslinking agent (any one of those described above).

In another preferred embodiment, the crosslinked polymeric material of the rigid hydrophobic insert comprises repeating units of at least one vinyl-functional polysiloxane that comprises at least two vinyl groups each directly attached to one silicon atom and at least 15% by mole of siloxane units each having at least one phenyl substituent.

In another preferred embodiment, the silicone hydrogel material comprises (a) repeating units of at least one first polysiloxane vinylic crosslinker comprising hydrophilized siloxane units each having one methyl substituent and one organic radical including at least one H-bond donor (preferably hydroxyl groups) and (b) repeating units of at least one hydrophilic vinylic monomer, wherein the content of said at least one H-bond donor is at least about 0.8 meq/g (preferably at least about 1.0 meq/g, more preferably at least about 1.2 meq/g, even more preferably at least about 1.4 meq/g) relative to the molecular weight of said at least one first polysiloxane vinylic crosslinker.

In a preferred embodiment, the silicone hydrogel material comprises at least about 5% (preferably at least about 10%, more preferably at least about 15%, even more preferably at least about 20%, most preferably at least about 25%) by weight of the first polysiloxane vinylic crosslinker. It is understood that the weight percentages of each of the components of the silicone hydrogel material of the invention can be obtained based on the weight percentages of its corresponding polymerizable component (material) in a polymerizable composition for making the silicone hydrogel material (or contact lens).

In accordance with the invention, the silicone hydrogel material of the embedded silicone hydrogel contact lens has an equilibrium water content (i.e., in fully hydrated state or when being fully hydrated) of from about 20% to about 70% (preferably from about 20% to about 65%, more preferably from about 25% to about 65%, even more preferably from about 30% to about 60%) by weight, an oxygen permeability of at least about 40 barrers (preferably at least about 60 barrers, more preferably at least about 80 barrers, more preferably at least about 100 barrers), and a modulus (i.e., Young's modulus) of about 1.5 MPa or less (preferably from about 0.2 MPa to about 1.2 MPa, more preferably from about 0.3 MPa to about 1.1 MPa, even more preferably from about 0.4 MPa to about 1.0 MPa).

Various embodiments including preferred embodiments of hydrophobic inserts, non-silicone hydrogel materials, and silicone hydrogel materials have been described above in this application and can be used in these aspects of the invention.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for producing embedded hydrogel contact lenses, comprising the steps of:
   (1) obtaining a female mold half, a first male mold half and a second male mold half, wherein the female mold half has a first molding surface defining the anterior surface of a contact lens to be molded, wherein the first male mold half has a second molding surface defining the back surface of an insert to be molded, wherein the second male mold half has a third molding surface defining the posterior surface of the contact lens to be molded, wherein the first male mold half and the female mold half are configured to receive each other such that an insert-molding cavity is formed between the second molding surface and a central portion of the first molding surface when the female mold half is closed with the first male mold half, wherein the second male mold half and the female mold half are configured to receive each other such that a lens-molding cavity is formed between the first and third molding surfaces when the female mold half is closed with the second male mold half;
   (2) dispensing an amount of an insert-forming composition on the central portion of the first molding surface of the female mold half;
   (3) placing the first male mold half on top of the insert-forming composition in the female mold half and closing the first male mold half and the female mold half to form a first molding assembly comprising the insert-forming composition within the insert-molding cavity;
   (4) curing the insert-forming composition in the insert-molding cavity of the first molding assembly to form a molded insert;
   (5) separating the first molding assembly obtained in step (4) into the first male mold half and the female mold half with the molded insert that is adhered onto the central area of the first molding surface;
   (6) dispensing a lens-forming composition in the female mold half with the molded insert adhered thereon in an amount sufficient for filling the lens-molding cavity;
   (7) placing the second male mold half on top of the lens-forming composition in the female mold half and closing the second male mold half and the female mold half to form a second molding assembly comprising the lens-forming composition and the molded insert immersed therein in the lens-molding cavity;
   (8) curing the lens-forming composition in the lens-molding cavity of the second molding assembly to form an embedded hydrogel lens precursor that comprises a bulk hydrogel material formed from the lens-forming composition and the insert completely or partially embedded in the bulk hydrogel material;
   (9) separating the second molding assembly obtained in step (8) into the second male mold half and the female mold half, with the embedded hydrogel lens precursor adhered on a lens-adhered mold half which is one of the female and second male mold halves;
   (10) removing the embedded hydrogel lens precursor from the lens-adhered mold half (preferably before the embedded hydrogel lens precursor is contact with water or any liquid); and
   (11) subjecting the embedded hydrogel lens precursor to post-molding processes including a hydration process and one or more other processes selected from the group consisting of extraction, surface treatment, packaging, sterilization, and combinations thereof.

2. The method of embodiment 1, wherein the first male mold half comprise an overflow groove which surrounds the molding surface and into which any excess insert-forming material is pressed when the first molding assembly is closed securely, wherein any flushes formed from the excess insert-forming material during step (4) can be stuck on the first male mold half during step of separating the first molding assembly halves, thereby removing the flushes.

3. The method of embodiment 1 or 2, wherein the front surface of the insert merges with or is buried at a depth of less than about 10 microns beneath the anterior surface of the contact lens, and the curvature of the front surface of the insert is identical to the curvature of a central zone, which has a diameter of the insert, of the anterior surface of the contact lens.

4. A method for producing embedded hydrogel contact lenses, comprising the steps of:
   (1) obtaining a first female mold half, a male mold half and a second female mold half, wherein the first female mold half has a first molding surface defining the front surface of an insert to be molded, wherein the male mold half has a second molding surface defining the posterior surface of a contact lens to be molded, wherein the second female mold half has a third molding surface defining the anterior surface of the contact lens to be molded, wherein the first female mold half and the male mold half are configured to receive each other such that an insert-molding cavity is formed between the first molding surface and a central portion of the second molding surface when the first female mold half is closed with the male mold half, wherein the second female mold half and the male mold half are configured to receive each other such that a lens-molding cavity is formed between the second and third molding surfaces when the second female mold half is closed with the male mold half;
   (2) dispensing an amount of an insert-forming composition on the first molding surface of the first female mold half;
   (3) placing the male mold half on top of the insert-forming composition in the first female mold half and closing the first female mold half and the male mold half to form a first molding assembly comprising the insert-forming composition within the insert-molding cavity;

(4) curing the insert-forming composition in the insert-molding cavity of the first molding assembly to form a molded insert;

(5) separating the first molding assembly obtained in step (4) into the first female mold half and the male mold half with the molded insert that is adhered onto the central portion of the second molding surface;

(6) dispensing a lens-forming composition in the second female mold half in an amount sufficient for filling the lens-molding cavity;

(7) placing the male mold half with the molded insert adhered thereon on top of the lens-forming composition in the second female mold half and closing the second female mold half and the male mold half to form a second molding assembly comprising the lens-forming composition and the molded insert immersed therein in the lens-molding cavity;

(8) curing the lens-forming composition in the lens-molding cavity of the second molding assembly to form an embedded hydrogel lens precursor that comprises a bulk hydrogel material formed from the lens-forming composition and the insert completely or partially embedded in the bulk hydrogel material;

(9) separating the second molding assembly obtained in step (8) into the second female mold half and the male mold half, with the embedded hydrogel lens precursor adhered on a lens-adhered mold half which is one of the male and second female mold halves;

(10) removing the embedded hydrogel lens precursor from the lens-adhered mold half (preferably before the embedded hydrogel lens precursor is contact with water or any liquid); and

(11) subjecting the embedded hydrogel lens precursor to post-molding processes including a hydration process and one or more other processes selected from the group consisting of extraction, surface treatment, packaging, sterilization, and combinations thereof.

5. The method of embodiment 4, wherein the first female mold half comprise an overflow groove which surrounds the molding surface and into which any excess insert-forming material is pressed when the first molding assembly is closed securely, wherein any flushes formed from the excess insert-forming material during step (4) can be stuck on the first female mold half during step of separating the first molding assembly halves, thereby removing the flushes.

6. The method of embodiment 4 or 5, wherein the back surface of the insert merges with or is buried at a depth of less than about 10 microns beneath the posterior surface of the contact lens, and the curvature of the back surface of the insert is identical to the curvature of a central zone, which has a diameter of the insert, of the posterior surface of the contact lens.

7. The method of any one of embodiments 1 to 6, wherein the step of (4) curing the insert-forming composition is carried out actinically by using UV and/or visible light.

8. The method of any one of embodiments 1 to 6, wherein the step of (4) curing the insert-forming composition is carried out thermally by heating the first molding assembly in an oven at one or more curing temperature selected from about 40° C. to about 100° C.

9. The method of any one of embodiments 1 to 8, wherein the step of (8) curing the lens-forming composition is carried out actinically by using UV and/or visible light.

10. The method of any one of embodiments 1 to 8, wherein the step of (8) curing the lens-forming composition is carried out thermally by heating the first molding assembly in an oven at one or more curing temperature selected from about 40° C. to about 100° C.

11. The method of any one of embodiments 1 to 10, wherein the insert-forming composition comprises at least one polymerizable photochromic compound (i.e., photochromic vinylic monomer), at least one UV-absorbing vinylic monomer, at least one UV/HEVL-absorbing vinylic monomer, at least one fluorescent vinylic monomer, or combinations thereof.

12. The method of any one of embodiments 1 to 10, wherein the insert-forming composition comprises at least one color-filtering material for correcting color blindness, a diffractive material, a high refractive-index material, or combinations.

13. An embedded hydrogel contact lens, comprising:
an anterior surface, an opposite posterior surface, a bulk hydrogel material, and an insert completely or partially embedded in the bulk hydrogel material,
wherein the insert is made of a polymeric material different from the bulk hydrogel material and has a front surface, an opposite back surface and a diameter up to about 13.0 mm,
wherein the insert is located in a central portion of the embedded hydrogel contact lens,
wherein one of the front and back surfaces of the insert is designated as an exposing surface while the other of the front and back surfaces is designated as a buried surface,
wherein the exposing surface merges with or is buried at a depth of less than about 10 microns beneath the anterior or posterior surface the curvature of which in a central zone having a diameter of the insert is substantially identical to the curvature of the exposing surface, wherein the buried surface is buried at a depth of at least about 20 microns beneath either the anterior surface or the posterior surface,
wherein the embedded hydrogel contact lens is not susceptible to delamination as demonstrated by being free of bubble when being inspected under microscopy at interfaces between the insert and the bulk material within the embedded hydrogel contact lens after being autoclaved in a packaging solution in a sealed package and then being stored for at least 3 weeks at 55° C., wherein the packaging solution is a phosphate buffered saline having a pH of 7.2±0.2.

14. The embedded hydrogel contact lens of embodiment 13, wherein the exposing surface merges with or is buried at a depth of less than about 10 microns beneath the anterior surface the curvature of which in the central zone having a diameter of the insert is substantially identical to the curvature of the exposing surface.

15. The embedded hydrogel contact lens of embodiment 13, wherein the exposing surface merges with or is buried at a depth of about 8 microns or less beneath the anterior surface the curvature of which in the central zone having a diameter of the insert is substantially identical to the curvature of the exposing surface.

16. The embedded hydrogel contact lens of embodiment 13, wherein the exposing surface merges with or is buried at a depth of about 6 microns or less beneath the anterior surface the curvature of which in the central zone having a diameter of the insert is substantially identical to the curvature of the exposing surface.

17. The embedded hydrogel contact lens of embodiment 13, wherein the exposing surface merges with or is buried at a depth of less than about 10 microns beneath the posterior surface the curvature of which in the central zone having a diameter of the insert is substantially identical to the curvature of the exposing surface.

18. The embedded hydrogel contact lens of embodiment 13, wherein the exposing surface merges with or is buried at a depth of about 8 microns or less beneath the posterior surface the curvature of which in the central zone having a diameter of the insert is substantially identical to the curvature of the exposing surface.

19. The embedded hydrogel contact lens of embodiment 13, wherein the exposing surface merges with or is buried at a depth of about 6 microns or less beneath the posterior surface the curvature of which in the central zone having a diameter of the insert is substantially identical to the curvature of the exposing surface.

20. The embedded hydrogel contact lens of any one of embodiments 13 to 19, wherein the buried surface is buried at a depth of at least about 25 microns beneath either the anterior surface or the posterior surface.

21. The embedded hydrogel contact lens of any one of embodiments 13 to 19, wherein the buried surface is buried at a depth of at least about 30 microns beneath either the anterior surface or the posterior surface.

22. The embedded hydrogel contact lens of any one of embodiments 13 to 21, wherein the insert comprises repeating units of at least one polymerizable photochromic compound (i.e., photochromic vinylic monomer), at least one UV-absorbing vinylic monomer, at least one UV/HEVL-absorbing vinylic monomer, at least one fluorescent vinylic monomer, or combinations thereof.

23. The embedded hydrogel contact lens of any one of embodiments 13 to 21, wherein the insert comprises at least one color-filtering material for correcting color blindness, a diffractive material, a high refractive-index material, or combinations.

24. The method of any one of embodiments 1 to 12 or the embedded hydrogel contact lens of any one of embodiments 13 to 23, wherein the insert is a hydrophobic insert.

25. The method or embedded hydrogel contact lens of embodiment 24, wherein the hydrophobic insert is hydrophobic rigid insert.

26. The method or embedded hydrogel contact lens of embodiment 24, wherein the hydrophobic insert is a rigid gas-permeable insert.

27. The method or embedded hydrogel contact lens of any one of embodiments 24 to 26, wherein the hydrophobic insert is composed of a crosslinked polymeric material that has an equilibrium water content of less than 5% by weight and comprises at least 55% by mole of repeating units of one or more acrylic monomers and/or one or more acrylic crosslinker and at least about 6% by mole of repeating units of at least one vinylic crosslinking agent.

28. The method or embedded hydrogel contact lens of embodiment 27, wherein the crosslinked polymeric material has an equilibrium water content of about 4% or less by weight.

29. The method or embedded hydrogel contact lens of embodiment 27, wherein the crosslinked polymeric material has an equilibrium water content of about 3% or less by weight.

30. The method or embedded hydrogel contact lens of embodiment 27, wherein the crosslinked polymeric material has an equilibrium water content of about 2% or less by weight.

31. The method or embedded hydrogel contact lens of any one of embodiments 27 to 30, wherein the crosslinked polymeric material comprises at least about 60% by mole of repeating units of said one or more acrylic monomers and/or said one or more acrylic crosslinker.

32. The method or embedded hydrogel contact lens of any one of embodiments 27 to 30, wherein the crosslinked polymeric material comprises at least about 65% by mole of repeating units of said one or more acrylic monomers and/or said one or more acrylic crosslinker.

33. The method or embedded hydrogel contact lens of any one of embodiments 27 to 30, wherein the crosslinked polymeric material comprises at least about 70% by mole of repeating units of said one or more acrylic monomers and/or said one or more acrylic crosslinker.

34. The method or embedded hydrogel contact lens of any one of embodiments 27 to 33, wherein the crosslinked polymeric material comprises at least about 8% by mole of repeating units of said at least one vinylic crosslinking agent.

35. The method or embedded hydrogel contact lens of any one of embodiments 27 to 33, wherein the crosslinked polymeric material comprises at least about 10% by mole of repeating units of said at least one vinylic crosslinking agent.

36. The method or embedded hydrogel contact lens of any one of embodiments 27 to 33, wherein the crosslinked polymeric material comprises at least about 12% by mole of repeating units of said at least one vinylic crosslinking agent.

37. The method or embedded hydrogel contact lens of any one of embodiments 27 to 36, wherein said at least one vinylic crosslinking agent comprises at least one acrylic crosslinking agent.

38. The method or embedded hydrogel contact lens of embodiment 37, wherein said at least one acrylic crosslinking agent is ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl) isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

39. The method or embedded hydrogel contact lens of embodiment 37, wherein said at least one acrylic crosslinking agent is allyl methacrylate, allyl acrylate, an aryl crosslinking agent, triallyl isocyanurate, 2,4,6-triallyloxy-1,3,5-triazine, 1,2,4-trivinylcyclohexane, or combinations thereof.

40. The method or embedded hydrogel contact lens of embodiment 37, wherein said at least one acrylic cross-linking agent is is divinylbenzene, 2-methyl-1,4-divinyl-benzene, bis(4-vinylphenyl)methane, 1,2-bs(4-vinylphenyl)ethane, or combinations thereof.

41. The method or embedded hydrogel contact lens of any one of embodiments 27 to 40, wherein the crosslinked polymeric material comprises repeating units of at least one acrylic monomer which comprises a silicone-containing acrylic monomer, a non-silicone hydrophobic acrylic monomer, a fluorine-containing acrylic monomer, an aryl acrylic monomer, or a combination thereof.

42. The method or embedded hydrogel contact lens of any one of embodiments 27 to 40, wherein the crosslinked polymeric material comprises repeating units of at least one non-silicone hydrophobic acrylic monomer.

43. The method or embedded hydrogel contact lens of embodiment 42, wherein said at least one non-silicone hydrophobic acrylic monomer is (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, or combinations thereof.

44. The method or embedded hydrogel contact lens of any one of embodiments 27 to 43, wherein the crosslinked polymeric material comprises repeating units of at least one fluorine-containing acrylic monomer.

45. The method or embedded hydrogel contact lens of embodiment 44, wherein said at least one fluorine-containing acrylic monomer is perfluorohexylethyl-thio-carbonyl-aminoethyl-methacrylate, 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, or combinations thereof.

46. The method or embedded hydrogel contact lens of any one of embodiments 27 to 45, wherein the crosslinked polymeric material comprises repeating units of at least one silicone-containing acrylic monomer.

47. The method or embedded hydrogel contact lens of any one of embodiments 27 to 46, wherein the crosslinked polymeric material comprises repeating units of at least one polysiloxane vinylic crosslinker.

48. The method or embedded hydrogel contact lens of embodiment 47, wherein said at least polysiloxane vinylic crosslinker comprises at least 30% by mole of siloxane units each having at least one phenyl substituent.

49. The method or embedded hydrogel contact lens of embodiment 47, wherein said at least polysiloxane vinylic crosslinker comprises at least 60% by mole of siloxane units each having at least one phenyl substituent.

50. The method or embedded hydrogel contact lens of embodiment 47, wherein said at least polysiloxane vinylic crosslinker comprises at least 90% by mole of siloxane units each having at least one phenyl substituent.

51. The method or embedded hydrogel contact lens of embodiment 47, wherein said at least polysiloxane vinylic crosslinker comprises three or more vinylphenylsiloxane units each having at least one phenyl substituent and one vinyl substituent.

52. The method or embedded hydrogel contact lens of embodiment 47, wherein said at least polysiloxane vinylic crosslinker comprises three or more phenylmethylsiloxane units.

53. The method or embedded hydrogel contact lens of embodiment 47, wherein said at least polysiloxane vinylic crosslinker comprises three or more diphenylsiloxane units.

54. The method or embedded hydrogel contact lens of embodiment 47, wherein said at least polysiloxane vinylic crosslinker comprises one or more vinyl terminated polyphenylmethysiloxanes, one or more vinylphenylmethyl terminated phenylmethyl-vinylphenylsiloxane copolymers, one or more vinyl terminated diphenylsiloxane-dimethylsiloxane copolymers, or combinations thereof.

55. The method or embedded hydrogel contact lens of embodiment 47, wherein said at least polysiloxane vinylic crosslinker comprises one or more vinyl terminated polyphenylmethysiloxanes.

56. The method or embedded hydrogel contact lens of embodiment 47, wherein said at least polysiloxane vinylic crosslinker comprises one or more vinylphenylmethyl terminated phenylmethyl-vinylphenylsiloxane copolymers.

57. The method or embedded hydrogel contact lens of any one of embodiments 27 to 56, wherein the crosslinked polymeric material comprises repeating units of at least one aryl acrylic monomer of formula (I) or (II)

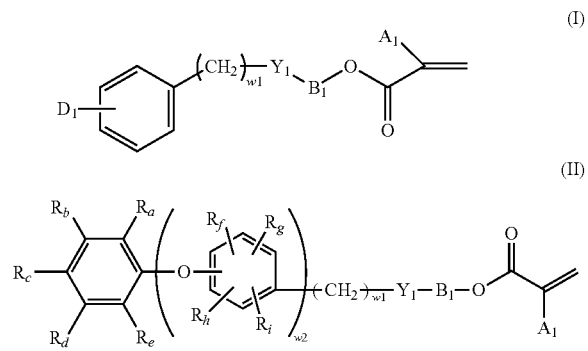

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

58. The method or embedded hydrogel contact lens of embodiment 57, wherein said at least one aryl acrylic monomer comprises at least one vinylic monomer selected from the group consisting of 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)

ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl) ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl) ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl) ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate, and combinations thereof.

59. The method or embedded hydrogel contact lens of embodiment 57, wherein said at least one aryl acrylic monomer comprises 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; 2-phenylethyl methacrylate; 3-phenylpropyl methacrylate; 4-phenylbutyl methacrylate; 5-phenyl pentyl methacrylate; 2-benzyloxyethyl methacrylate; 3-benzyloxypropyl methacrylate; 2-[2-(benzyloxy)ethoxy]ethyl methacrylate, or combinations thereof.

60. The method or embedded hydrogel contact lens of any one of embodiments 27 to 59, wherein the crosslinked polymeric material comprises repeating units of at least one hydrohobic vinylic monomer selected from the group consisting of a vinyl alkanoate, a vinyloxyalkane, styrene, vinyl toluene, vinyl chloride, vinylidene chloride, 1-butene, and combinations thereof.

61. The method or embedded hydrogel contact lens of any one of embodiments 27 to 60, wherein the hydrophobic insert is rigid.

62. The method of any one of embodiments 1-12 and 27-61 or the embedded hydrogel contact lens of any one of embodiments 13-61, wherein the bulk hydrogel material is a non-silicone hydrogel material comprising at least 50% by mole of repeating units of at least one hydroxyl-containing vinylic monomer.

63. The method or embedded hydrogel contact lens of embodiment 62, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth) acrylamide, N-tris(hydroxymethyl)methyl (meth)acrylamide, vinyl alcohol, allyl alcohol, and combinations thereof.

64. The method of any one of embodiments 1-12 and 27-61 or the embedded hydrogel contact lens of any one of embodiments 13-61, wherein the bulk hydrogel material is a silicone hydrogel material that comprises (a) repeating units of at least one first polysiloxane vinylic crosslinker comprising hydrophilized siloxane units each having one methyl substituent and one organic radical including at least one H-bond donor and (b) repeating units of at least one hydrophilic vinylic monomer, wherein the content of said at least one H-bond donor is at least about 0.8 meq/g relative to the molecular weight of said at least one first polysiloxane vinylic crosslinker.

65. The method or embedded hydrogel contact lens of embodiment 64, wherein said at least one first polysiloxane vinylic crosslinker comprises hydrophilized siloxane units each having one methyl substituent and one organic radical including at least one hydroxyl groups.

66. The method or embedded hydrogel contact lens of embodiment 64 or 65, wherein the content of said at least one H-bond donor is at least about 1.0 meq/g relative to the molecular weight of said at least one first polysiloxane vinylic crosslinker.

67. The method or embedded hydrogel contact lens of embodiment 64 or 65, wherein the content of said at least one H-bond donor is at least about 1.2 meq/g relative to the molecular weight of said at least one first polysiloxane vinylic crosslinker.

68. The method or embedded hydrogel contact lens of embodiment 64 or 65, wherein the content of said at least one H-bond donor is at least about 1.4 meq/g relative to the molecular weight of said at least one first polysiloxane vinylic crosslinker.

69. The method or embedded hydrogel contact lens of any one of embodiments 64 to 68, wherein said at least one first polysiloxane vinylic crosslinker comprises a di(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.

70. The method or embedded hydrogel contact lens of any one of embodiments 64 to 68, wherein said at least one first polysiloxane vinylic crosslinker comprises comprises a vinylic crosslinker of formula (G)

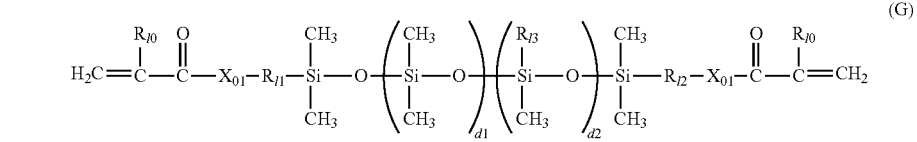

(G)

in which:
d1 is an integer of from 30 to 500 and d2 is an integer of from 1 to 75, provided that d2/d1 is from about 0.035 to about 0.15;
$X_{01}$ is O or $NR_{IN}$ in which $R_{IN}$ is hydrogen or $C_1$-$C_{10}$-alkyl; $R_{I0}$ is hydrogen or methyl;
$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (G-1) to (G-5)

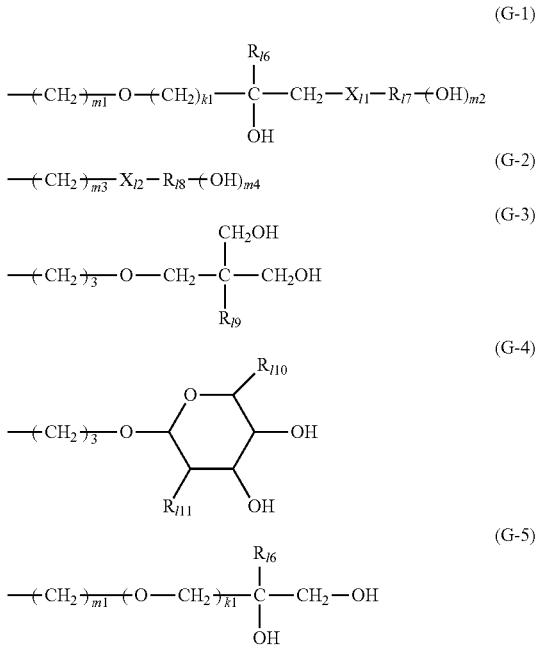

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a tertiary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of

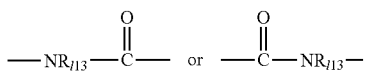

in which $R_{I13}$ is hydrogen or $C_1$-$C_{10}$ alkyl.

71. The method or embedded hydrogel contact lens of embodiment 70, wherein in formula (G) d2/d1 is from about 0.040 to about 0.12.

72. The method or embedded hydrogel contact lens of embodiment 70, wherein in formula (G) d2/d1 is from about 0.045 to about 0.10.

73. The method or embedded hydrogel contact lens of any one of embodiments 70 to 72, wherein in formula (G) $R_{I3}$ is a monovalent radical of formula (G-1).

74. The method or embedded hydrogel contact lens of any one of embodiments 70 to 72, wherein in formula (G) $R_{I3}$ is a monovalent radical of formula (G-2).

75. The method or embedded hydrogel contact lens of any one of embodiments 70 to 72, wherein in formula (G) $R_{I3}$ is a monovalent radical of formula (G-3).

76. The method or embedded hydrogel contact lens of any one of embodiments 70 to 72, wherein in formula (G) $R_{I3}$ is a monovalent radical of formula (G-4).

77. The method or embedded hydrogel contact lens of any one of embodiments 70 to 72, wherein in formula (G) $R_{I3}$ is a monovalent radical of formula (G-5).

78. The method or embedded hydrogel contact lens of any one of embodiments 64 to 77, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth) acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(emth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammoniurn 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-Z-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

79. The method or embedded hydrogel contact lens of any one of embodiments 64 to 77, wherein said at least one hydrophilic vinylic monomer comprises N-vinylpyrrolidone, N-vinyl-N-methyl acetamide, or combinations thereof.

80. The method or embedded hydrogel contact lens of any one of embodiments 64 to 79, wherein said at least one hydrophilic vinylic monomer comprises N,N-dimethyl (meth)acrylamide.

81. The method or embedded hydrogel contact lens of any one of embodiments 64 to 80, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

82. The method or embedded hydrogel contact lens of any one of embodiments 64 to 81, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

83. The method or embedded hydrogel contact lens of any one of embodiments 64 to 81, wherein the silicone hydrogel material comprises repeating units of at least one silicone-containing vinylic monomer of formula (M1) or (M2)

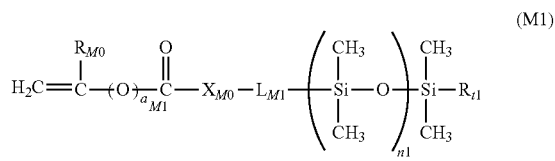

-continued

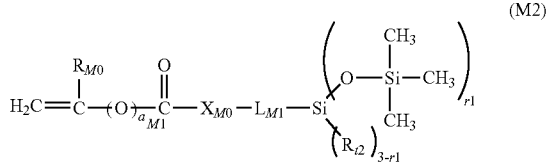

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

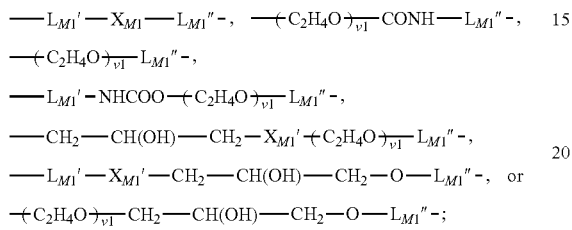

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3.

84. The method or embedded hydrogel contact lens of any one of embodiments 64 to 81, wherein the silicone hydrogel material comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy) propyl) (meth)acrylamide, N-[tris(dimethylpropylsiloxy)silylpropyl]-(meth)acrylamide, N-[tris(dimethylphenylsiloxy)-silylpropyl] (meth)acrylamide, N-[tris(dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl] (meth)acrylamide, N-[2-hydroxy-3-(3-(t-butyldimethylsilyl) propyloxy)-propyl]-2-methyl (meth)acrylamide, N-[2-hydroxy-3-(3-(t-butyldimethylsilyl)propyloxy)-propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silylcarbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

85. The method or embedded hydrogel contact lens of any one of embodiments 64 to 84, wherein the silicone hydrogel material comprises α-(meth)acryloxypropyl terminated ω—$C_1$-$C_4$-alkyl terminated polydimethylsiloxane, α-(meth)acryloxy-2-hydroxypropyloxypropyl terminated ω—$C_1$-$C_4$-alkyl terminated polydimethylsiloxane, α-(2-hydroxyl-methacryloxypropyloxypropyl)-ω—$C_1$-$C_4$-alkyl-decamethylpentasiloxane, α-[3-(meth)acryloxyethoxy-2-hydroxypropyloxypropyl]-terminated ω—$C_1$-$C_4$-alkyl terminated polydimethylsiloxane, α-[3-(meth)acryloxy-propyloxy-2-hydroxypropyloxypropyl]-terminated ω—$C_1$-$C_4$-alkyl terminated polydimethylsiloxane, α-[3-(meth)acryloxyisopropyloxy-2-hydroxypropyloxypropyl]-terminated ω—$C_1$-$C_4$-alkyl terminated polydimethylsiloxane, α-[3-(meth)acryloxy-butyloxy-2-hydroxypropyloxypropyl]-terminated ω—$C_1$-$C_4$-alkyl terminated polydimethylsiloxane, α-[3-(meth)acryloxyethylamino-2-hydroxypropyloxypropyl]-terminated ω—$C_1$-$C_4$-alkyl terminated polydimethylsiloxane, α-[3-(meth)acryloxypropylamino-2-hydroxypropyloxypropyl]-terminated ω—$C_1$-$C_4$-alkyl terminated polydimethylsiloxane, α-[3-(meth)acryloxybutylamino-2-hydroxypropyloxypropyl]-terminated ω—$C_1$-$C_4$-alkyl terminated polydimethylsiloxane, α-(meth)acryloxy(polyethylenoxy)-2-hydroxypropyloxypropyl]-terminated ω—$C_1$-$C_4$-alkyl terminated polydimethylsiloxane, α-[(meth)acryloxy-2-hydroxypropyloxy-ethoxypropyl]-terminated ω—$C_1$-$C_4$-alkyl terminated polydimethylsiloxane, α-[(meth)acryloxy-2-hydroxypropyl-N-ethylaminopropyl]-terminated ω—$C_1$-$C_4$-alkyl terminated polydimethylsiloxane, α-[(meth)acryloxy-2-hydroxypropyl-aminopropyl]-terminated ω—$C_1$-$C_4$-alkyl terminated polydimethylsiloxane, α-[(meth)acryloxy-2-hydroxypropyloxy-(polyethylenoxy)propyl]-terminated ω—$C_1$-$C_4$-alkyl terminated polydimethylsiloxane, α-(meth)acryloylamidopropyloxypropyl terminated ω—$C_1$-$C_4$-alkyl terminated polydimethylsiloxane, α-N-methyl-(meth)acryloylamidopropyloxypropyl terminated ω—$C_1$-$C_4$-alkyl terminated polydimethylsiloxane, α-[3-(meth)acrylamidoethoxy-2-hydroxypropyloxy-propyl]-terminated ω—$C_1$-$C_4$-alkyl polydimethylsiloxane, α-[3-(meth)acrylamidopropyloxy-2-hydroxypropyloxypropyl]-terminated ω—$C_1$-$C_4$-alkyl terminated polydimethylsiloxane, α-[3-(meth)acrylamidoisopropyloxy-2-hydroxypropyloxypropyl]-terminated ω—$C_1$-$C_4$-alkyl terminated polydimethylsiloxane, α-[3-(meth)acrylamidobutyloxy-2-hydroxypropyloxypropyl]-terminated ω—$C_1$-$C_4$-alkyl terminated polydimethylsiloxane, α-[3-(meth)acryloylamido-2-hydroxypropyloxypropyl] terminated ω—$C_1$-$C_4$-alkyl polydimethylsiloxane, α-[3-[N-methyl-(meth)acryloylamido]-2-hydroxypropyloxypropyl] terminated ω—$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω—$C_1$-$C_4$-alkyl-terminated polydimethylsiloxanes, α-vinyl carbamate-terminated ω—$C_1$-$C_4$-alkyl-terminated polydimethylsiloxane, or a mixture thereof. 86. The method or embedded hydrogel contact lens of any one of embodiments 64 to 85, wherein the silicone hydrogel material comprises repeating units of at least one second polysiloxane vinylic crosslinker.

87. The method or embedded hydrogel contact lens of embodiment 86, wherein said at least one second polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N, N, N', N'-tetrakis(3-methacryloxy-2-hydroxypropyl)-alpha,omega-bis-3-aminopropyl-polydimethylsiloxane, or a combination thereof.

88. The method or embedded hydrogel contact lens of embodiment 86, wherein said at least one second polysiloxane vinylic crosslinker comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

89. The method or embedded hydrogel contact lens of embodiment 86, wherein said at least one second polysiloxane vinylic crosslinker comprises α,β-bis[3-(meth)acrylamidopropyl]-terminated polydimethylsiloxane, α,β-bis[3-(meth)acryloxypropyl]-terminated polydimethylsiloxane, α,β-bis[3-(meth)acryloxy-2-hydroxypropyloxypropyl]-terminated polydimethylsiloxane, α,β-bis[3-(meth)acryloxyethoxy-2-hydroxypropyloxypropyl]-terminated polydimethylsiloxane, α,β-bis[3-(meth)acryloxypropyloxy-2-hydroxypropyloxypropyl]-terminated polydimethylsiloxane, α,β-bis[3-(meth)acryloxy-isopropyloxy-2-hydroxypropyloxypropyl]-terminated polydimethylsiloxane, α,β-bis[3-(meth)acryloxybutyloxy-2-hydroxypropyloxypropyl]-terminated polydimethylsiloxane, α,β-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,β-bis[3-(meth)acrylamidoisopropyloxy-2-hydroxypropyloxypropyl]-terminated polydimethylsiloxane, α,β-bis[3-(meth)acrylamidobutyloxy-2-hydroxypropyloxypropyl]-terminated polydimethylsiloxane, α,β-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,β-bis[3-(meth)acryloxybutylamino-2-hydroxypropyloxypropyl]-terminated polydimethylsiloxane, α,β-bis[(meth)acrylamidoethylamino-2-hydroxypropyloxy-propyl]-terminated polydimethylsiloxane, α,β-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,β-bis[(meth)acryloxy-2-hydroxypropyloxy-ethoxypropyl]-terminated polydimethylsiloxane, α,β-bis[(meth)acryloxy-2-hydroxypropyl-N-ethylaminopropyl]-terminated polydimethylsiloxane, α,β-bis[(meth)acryloxy-2-hydroxypropylaminopropyl]-polydimethylsiloxane, α,β-bis[(meth)acryloxy-2-hydroxypropyloxy-(polyethylenoxy) propyl]-terminated polydimethylsiloxane, α,β-bis[(meth)acryloxyethylamino-carbonyloxy-ethoxypropyl]-terminated polydimethylsiloxane, α, ω-bis[(meth)acryloxyethylamino-carbonyloxy-(polyethylenoxy) propyl]-terminated polydimethylsiloxane, or combinations thereof.

90. The method or embedded hydrogel contact lens of any one of embodiments 64 to 89, wherein the silicone hydrogel material comprises repeating units of at least one non-silicone vinylic cross-linking agent.

91. The method or embedded hydrogel contact lens of embodiment 90, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl] tetrahydrofuan, diacrylamide, dimethacrylamide, N, N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane tri methacrylate, pentaerythritol tetramethacrylate, bisphenol A dimethacrylate, allylmethacrylate, allylacrylate, N-allyl-methacrylamide, N-allyl-acrylamide, or combinations thereof.

92. The method or embedded hydrogel contact lens of any one of embodiments 64 to 91, wherein the silicone hydrogel material comprises repeating units of at least one blending vinylic monomer.

93. The method or embedded hydrogel contact lens of embodiment 92, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.

94. The method or embedded hydrogel contact lens of any one of embodiments 64 to 93, wherein the silicone hydrogel material comprises repeating units of at least one polymerizable material selected from the group consisting of a UV-absorbing vinylic monomer, a UV/HEVL-absorbing vinylic monomer, a photochromic vinylic monomer, a polymerizable dye, and combinations thereof.

95. The method or embedded hydrogel contact lens of any one of embodiments 64 to 94, wherein the silicone hydrogel material comprises at least about 5% by weight of the first polysiloxane vinylic crosslinker.

96. The method or embedded hydrogel contact lens of any one of embodiments 64 to 94, wherein the silicone hydrogel material comprises at least about 10% by weight of the first polysiloxane vinylic crosslinker.
97. The method or embedded hydrogel contact lens of any one of embodiments 64 to 94, wherein the silicone hydrogel material comprises at least about 15% by weight of the first polysiloxane vinylic crosslinker.
98. The method or embedded hydrogel contact lens of any one of embodiments 64 to 94, wherein the silicone hydrogel material comprises at least about 20% by weight of the first polysiloxane vinylic crosslinker.
99. The method or embedded hydrogel contact lens of any one of embodiments 64 to 94, wherein the silicone hydrogel material comprises at least about 25% by weight of the first polysiloxane vinylic crosslinker.
100. The method or embedded hydrogel contact lens of any one of embodiments 64 to 99, wherein the silicone hydrogel material has an equilibrium water content (i.e., in fully hydrated state or when being fully hydrated) of from about 20% to about 70% by weight, an oxygen permeability of at least about 40 barrers, and a modulus (i.e., Young's modulus) of about 1.5 MPa or less.
101. The method or embedded hydrogel contact lens of any one of embodiments 64 to 99, wherein the silicone hydrogel material has an equilibrium water content (i.e., in fully hydrated state or when being fully hydrated) of from about 20% to about 65% by weigh.
102. The method or embedded hydrogel contact lens of any one of embodiments 64 to 99, wherein the silicone hydrogel material has an equilibrium water content (i.e., in fully hydrated state or when being fully hydrated) of from about 25% to about 65% by weigh.
103. The method or embedded hydrogel contact lens of any one of embodiments 64 to 99, wherein the silicone hydrogel material has an equilibrium water content (i.e., in fully hydrated state or when being fully hydrated) of from about 30% to about 60% by weigh.
104. The method or embedded hydrogel contact lens of any one of embodiments 64 to 103, wherein the silicone hydrogel material has an oxygen permeability of at least about 60 barrers.
105. The method or embedded hydrogel contact lens of any one of embodiments 64 to 103, wherein the silicone hydrogel material has an oxygen permeability of at least about 80 barrers.
106. The method or embedded hydrogel contact lens of any one of embodiments 64 to 103, wherein the silicone hydrogel material has an oxygen permeability of at least about 100 barrers.
107. The method or embedded hydrogel contact lens of any one of embodiments 64 to 106, wherein the silicone hydrogel material has a modulus (i.e., Young's modulus) of from about 0.2 MPa to about 1.2 MPa.
108. The method or embedded hydrogel contact lens of any one of embodiments 64 to 106, wherein the silicone hydrogel material has a modulus (i.e., Young's modulus) of from about 0.3 MPa to about 1.1 MPa.
109. The method or embedded hydrogel contact lens of any one of embodiments 64 to 106, wherein the silicone hydrogel material has a modulus (i.e., Young's modulus) of from about 0.4 MPa to about 1.0 MPa.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of an insert and an insert material are determined according to procedures described in ISO 18369-4.

Ion Permeability Measurements

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The storage modulus (Young's modulus) of inserts is determined using a TA RSA-G2 DMA (Dynamic Mechanical Analyzer). The insert is cut into a 3.08 mm wide strip using Precision Concept dry lens cutter. Five thickness values are measured within 6.5 mm gauge length. The strip is mounted on the instrument with metal grips. Oscillation temperature ramp test with a linear ramping rate at 2° C./minute from 10° C.~50° C. is applied on the insert, the material response to increasing temperature is monitored at a constant frequency of 1 Hz, constant amplitude of 0.5% deformation and sampling rate of 10.0 pts/s. Storage modulus (E'), loss modulus (E") and tan δ data are calculated by TRIOS software.

The elastic modulus of a silicone hydrogel material or contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Delamination

Embedded hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (Model JCF; OPTIMEC England). After the contact lens is settled under the influence of gravity, the front view of the contact lens is inspected carefully for any sign of circular pattern. Delamination displays as circular patterns in Optimec image.

OCT (Spectral Domain Optical Coherence Tomography; Telesto-II; Thorlabs) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately ¾ with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Chemicals

The following abbreviations are used in the following examples: PETA represents pentaerythritol tetraacrylate; TrisMA represents 3-[Tris(trimethylsiloxy)silyl]propyl methacrylate; HFIPMA represents hexafluoroisopropyl methacrylate; NPGDMA represents neopentyl glycol dimethacrylate; DMA represents N,N-dimethyl acrylamide; MMA represents methyl methacrylate; TEGDMA represent triethyleneglycol dimethacrylate; VAZO 67 represents 2,2'-azobis(2-methylbutyronitrile); RB247 is Reactive Blue 247; EGBE represents ethylene glycol butyl ether; PBS represents a phosphate-buffered saline which has a pH of 7.2±0.2 at 25° C. and contains about 0.044 wt. % $NaH_2PO_4.H_2O$, about 0.388 wt. % $Na_2HPO_4.2H_2O$, and about 0.79 wt. % NaCl and; wt. % represents weight percent; "H4" macromer represents a di-methacryloyloxypropyl-terminated polysiloxane (Mn 11.3K-12.3K g/mol, OH content~1.82-2.01 meq/g) of formula (A) shown below.

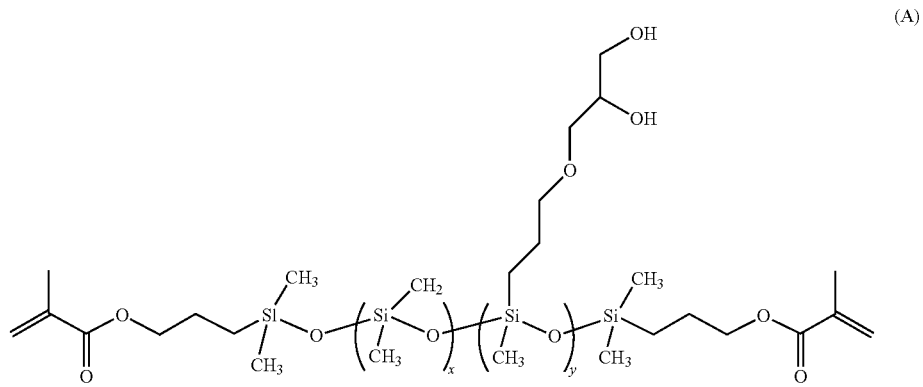

(A)

Example 2

Insert-Forming Compositions

Insert-forming compositions (i.e., Insert formulations) for making rigid hydrophobic inserts are prepared at room temperature in air by blending all the components (materials) in their desired amounts (weight parts units) to have the composition shown in Table 1 a-b.

TABLE 1A

| Insert | Insert-Forming Composition (weight part units) | | | | | |
|---|---|---|---|---|---|---|
| Formulation# | HFIPMA | NPGDMA | TrisMA | PETA | RB247 | Vazo-67 |
| 1 | 45 | 21 | 45 | 0.5 | 3 | 0.5 |
| 2 | 45 | 16 | 45 | 0.5 | 3 | 0.5 |
| 3 | 45 | 26 | 45 | 0.5 | 3 | 0.5 |
| 4 | 45 | 39 | 45 | 0.5 | 3 | 0.5 |

TABLE 1b

| Insert | Insert-Forming Composition (weight part units) | | | |
|---|---|---|---|---|
| Formulation# | PEMA | D6 | BDDA | Vazo-64 |
| 5 | 62 | 27 | 10 | 1 |
| 6 | 89 | 0 | 10 | 1 |

Lens-Forming Compositions

Lens-forming compositions (i.e., SiHy lens formulations) are prepared at room temperature in air by blending all the components (materials) in their desired amounts (weight parts units) to have the composition shown in Table 2.

TABLE 2

| SiHy Lens | Lens-Forming Composition (weight per units) | | | | | | |
|---|---|---|---|---|---|---|---|
| Formulation # | H4 | TrisMA | DMA | MMA | TEGDMA | EGBE | VAZO-67 |
| 1 | 33 | 17 | 24 | 15 | 1 | 25.5 | 0.5 |
| 2 | 33 | 17 | 20 | 15 | 5 | 25.5 | 0.5 |
| 3 | 40 | 0 | 20 | 15 | 0 | 25 | 1 |

Preparation of Embedded Silicone Hydrogel Contact Lenses

An insert-forming composition prepared above is purged with nitrogen at room temperature for 30 to 35 minutes. A specific volume (e.g., 30-40 mg) of the $N_2$-purged insert-forming composition is disposed in the center of the molding surface of a female lens mold half that is made of polypropylene and the molding surface defines the anterior surface of a contact lens to be molded. The female lens mold half with the insert-forming composition therein is closed with a male insert mold half which is made of polypropylene and designed to have an overflow groove into which any excess insert-forming composition is pressed during closing for forming a first molding assembly. The male insert mold half has a molding surface defining the posterior surface of an insert to be molded. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert-forming compositions in the first molding assemblies are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The first molding assemblies are opened and the molded inserts are adhered onto the central area of the molding surface of the female lens mold halves.

A lens-forming composition prepared above is purged with nitrogen at room temperature for 30 to 35 minutes. A specific volume (e.g., 50-60 mg) of the $N_2$-purged lens-forming composition is disposed onto the molded insert adhered onto the central portion of the molding surface of the female lens mold half. The female lens mold half with the insert adhered thereonto and with the lens-forming composition is closed with a male lens mold half which is made of polypropylene and designed to have an overflow groove into which any excess lens-forming composition is pressed during closing for forming a second molding assembly. The male lens mold half has a molding surface defining the posterior surface of a contact lens to be molded. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The closed $2^{nd}$ molding assemblies each with a molded insert immersed in a lens-forming composition in the lens molding cavities are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The $2^{nd}$ molding assemblies each with a molded embedded hydrogel lens precursor therein are mechanically opened. The molded embedded hydrogel lens precursor adheres to the male mold halves or female mold halves. Molded embedded hydrogel lens precursors adhered to male mold halves are delensed using ultrasonic unit; molded embedded hydrogel lens precursors adhered to female mold halves are delensed are manually from lens-adhered female mold halves.

Figure 3:
FIG. 3 shows an OCT image of an embedded hydrogel contact lens produced according to a method of the invention.

The delensed embedded hydrogel lens precursors can be extracted with a mixture of 50:50 of propylene glycol:water. Preferably, the delensed embedded hydrogel lens precursors are subjected to the following extraction/hyradtion, coating, autoclave processes as follows. The embedded hydrogel lens precursors are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of a in-package-coating packaging saline which is prepared according to the procedure described in Example 19 of U.S. Pat. No. 8,480,227; and finally autoclaved for about 45 minutes at 121° C. The resultant embedded SiHy contact lenses each have a hydrogel coating thereon. FIG. 3 shows an OCT image of the embedded SiHy contact lens obtained from the combination of Insert Formulation #4 and SiHy Lens Formulation #2.

The obtained embedded SiHy contact lenses are examined for delamination according to the procedures described in Example 1. No bubble is observed under microscopy at interfaces between the insert and the SiHy bulk material within the embedded silicone hydrogel contact lens after being stored for at least 3 weeks at 55° C., i.e., no delamination. The results are reported in Table 3.

TABLE 3

| SiHy Lens | Embedded SiHy Contact lenses | | | | | | | |
|---|---|---|---|---|---|---|---|---|
| Formulation # | 1 | 2 | 1 | 1 | 1 | 2 | 3 | 3 |
| Insert Formulation # | 1 | 1 | 2 | 3 | 4 | 4 | 5 | 6 |
| Delamination | No | No | No | No | No | No | No | No |

Preparation of Silicone Hydrogel Contact Lenses

Silicone hydrogel contact lens are prepared from SiHy Lens Formulation #1 & 2 (described in table 2) according to the procedures described for making embedded SiHy contact lenses, except that no insert is ever involved. The oxygen permeability (Dk), ion permeability (IP), and equilibrium water content of the obtained SiHy contact lenses are determined according to the procedures described in Example 1 and reported in table 4.

TABLE 4

| SiHy Lens Formulation | Properties of SiHy Contact Lens | | |
|---|---|---|---|
| # | Dk (Barrers) | Modulus (MPa) | IP* |
| 1 | 114 ± 1 (N = 5) | 0.69 ± 0.01 (N = 5) | 2.3 ± 0.3 (N = 6) |
| 2 | 101 ± 1 (N = 3) | 1.84 ± 0.03 (N = 3) | 0.4 ± 0.1 (N = 3) |

*relative to Alsacon lens material that has an ionoflux diffusion coefficient of $0.314 \times 10^{-3}$ mm$^2$/minute.

Example 3

Insert-Forming Compositions

Insert-forming composition (i.e., Insert formulations) for making fluorescent inserts is prepared at room temperature in air by blending all the components (materials) in their desired amounts (weight parts units) to have the composition shown in Table 5.

TABLE 5

| Chemical Component | Target parts |
|---|---|
| TEGDMA | 2 |
| D6 | 31 |
| H4 | 20 |
| DMA | 17 |
| MMA | 9 |
| EGMA | 10.2 |
| TAA | 15 |
| Rhodamine | 0.5 |
| Vazo-64 | 0.5 |

Lens-Forming Compositions

Lens-forming composition is prepared at room temperature in air by blending all the components (materials) in their desired amounts (weight parts units) to have the composition shown in Table 6.

TABLE 6

| Chemical Component | Target parts |
|---|---|
| H4 | 32 |
| DMA | 24 |
| TRISMA | 21 |
| Darocur 1173 | 1 |
| PPG425 | 22 |

Preparation of Embedded Silicone Hydrogel Contact Lenses

An insert-forming composition prepared above is purged with nitrogen at room temperature for 30 to 35 minutes. A specific volume (e.g. 35 microliters) of the N$_2$-purged insert-forming composition is disposed in the center of the molding surface of a female lens mold half that is made of polypropylene and the molding surface defines the anterior surface of a contact lens to be molded. The female lens mold half with the insert-forming composition therein is closed with a male insert mold half which is made of polypropylene and designed to have an overflow groove into which any excess insert-forming composition is pressed during closing for forming a first molding assembly. The male insert mold half has a molding surface defining the posterior surface of an insert to be molded. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert-forming compositions in the first molding assemblies are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The first molding assemblies are opened and the molded inserts are adhered onto the central area of the molding surface of the female lens mold halves.

A lens-forming composition prepared above is purged with nitrogen at room temperature for 30 to 35 minutes. A specific volume (e.g. 60 microliters) of the N$_2$-purged lens-forming composition is disposed onto the molded insert adhered onto the central portion of the molding surface of the female lens mold half. The female lens mold half with the insert adhered thereonto and with the lens-forming composition is closed with a male lens mold half which is made of polypropylene and designed to have an overflow groove into which any excess lens-forming composition is pressed during closing for forming a second molding assembly. The male lens mold half has a molding surface defining the posterior surface of a contact lens to be molded.

The closed $2^{nd}$ molding assemblies each with a molded insert immersed in a lens-forming composition in the lens molding cavities are actinically cured by UV/visible light (Hamamatsu lamp) at an intensity of 5 mW/cm$^2$ for about 30 minutes. The $2^{nd}$ molding assemblies each with a molded embedded hydrogel lens precursor therein are mechanically opened. The molded embedded hydrogel lens precursor adhere to the male mold halves or female mold halves. Molded embedded hydrogel lens precursors adhered to male mold halves are delensed using ultrasonic unit; molded embedded hydrogel lens precursors adhered to female mold halves are delensed are manually from lens-adhered female mold halves.

The delensed embedded hydrogel lens precursors can be extracted with a mixture of 50:50 of propylene glycol:water. Preferably, the delensed embedded hydrogel lens precursors are subjected to the following extraction/hyradtion, coating, autoclave processes as follows. The embedded hydrogel lens precursors are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of a in-package-coating packaging saline which is prepared according to the procedure described in Example 19 of U.S. Pat. No. 8,480,227; and finally autoclaved for about 45 minutes at 121° C. The resultant embedded SiHy contact lenses each have a hydrogel coating thereon. FIG. 4 shows an OCT image of the embedded SiHy contact lens obtained.

The obtained embedded SiHy contact lenses are examined for delamination according to the procedures described in Example 1. No bubble is observed under microscopy at interfaces between the insert and the SiHy bulk material within the embedded silicone hydrogel contact lens, i.e., no delamination.

All the publications, patents, and patent application publications, which have been cited herein above in this application, are hereby incorporated by reference in their entireties.

What is claimed is:

1. A method for producing embedded hydrogel contact lenses, comprising the steps of:
   (1) obtaining a female mold half, a first male mold half and a second male mold half, wherein the female mold half has a first molding surface defining the anterior surface of a contact lens to be molded, wherein the first male mold half has a second molding surface defining the back surface of an insert to be molded, wherein the second male mold half has a third molding surface defining the posterior surface of the contact lens to be molded, wherein the first male mold half and the female mold half are configured to receive each other such that an insert-molding cavity is formed between the second molding surface and a central portion of the first molding surface when the female mold half is closed with the first male mold half, wherein the second male mold half and the female mold half are configured to receive each other such that a lens-molding cavity is formed between the first and third molding surfaces when the female mold half is closed with the second male mold half;
   (2) dispensing an amount of an insert-forming composition on the central portion of the first molding surface of the female mold half;
   (3) placing the first male mold half on top of the insert-forming composition in the female mold half and closing the first male mold half and the female mold half to form a first molding assembly comprising the insert-forming composition within the insert-molding cavity;
   (4) curing the insert-forming composition in the insert-molding cavity of the first molding assembly to form a molded insert;
   (5) separating the first molding assembly obtained in step (4) into the first male mold half and the female mold half with the molded insert that is adhered onto the central area of the first molding surface;
   (6) dispensing a lens-forming composition in the female mold half with the molded insert adhered thereon in an amount sufficient for filling the lens-molding cavity;
   (7) placing the second male mold half on top of the lens-forming composition in the female mold half and closing the second male mold half and the female mold half to form a second molding assembly comprising the lens-forming composition and the molded insert immersed therein in the lens-molding cavity;
   (8) curing the lens-forming composition in the lens-molding cavity of the second molding assembly to form an embedded hydrogel lens precursor that comprises a bulk hydrogel material formed from the lens-forming composition and the insert completely or partially embedded in the bulk hydrogel material;
   (9) separating the second molding assembly obtained in step (8) into the second male mold half and the female mold half, with the embedded hydrogel lens precursor adhered on a lens-adhered mold half which is one of the female and second male mold halves;
   (10) removing the embedded hydrogel lens precursor from the lens-adhered mold half; and
   (11) subjecting the embedded hydrogel lens precursor to post-molding processes including a hydration process and one or more other processes selected from the group consisting of extraction, surface treatment, packaging, sterilization, and combinations thereof.

2. The method of claim 1, wherein the first male mold half comprise an overflow groove which surrounds the molding surface and into which any excess insert-forming material is pressed when the first molding assembly is closed securely, wherein any flushes formed from the excess insert-forming material during step (4) can be stuck on the first male mold half during step of separating the first molding assembly halves, thereby removing the flushes.

3. The method of claim 1, wherein the front surface of the insert merges with or is buried at a depth of less than about 10 microns beneath the anterior surface of the contact lens, and the curvature of the front surface of the insert is identical to the curvature of a central zone, which has a diameter of the insert, of the anterior surface of the contact lens.

4. The method of claim 1, wherein the step of (4) curing the insert-forming composition is carried out actinically by using UV and/or visible light.

5. The method of claim 4, wherein the step of (8) curing the lens-forming composition is carried out actinically by using UV and/or visible light.

6. The method of claim 4, wherein the step of (8) curing the lens-forming composition is carried out thermally by heating the first molding assembly in an oven at one or more curing temperature selected from about 40° C. to about 100° C.

7. The method of claim 1, wherein the step of (4) curing the insert-forming composition is carried out thermally by heating the first molding assembly in an oven at one or more curing temperature selected from about 40° C. to about 100° C.

8. The method of claim 7, wherein the step of (8) curing the lens-forming composition is carried out thermally by heating the first molding assembly in an oven at one or more curing temperature selected from about 40° C. to about 100° C.

9. The method of claim 7, wherein the step of (8) curing the lens-forming composition is carried out actinically by using UV and/or visible light.

10. A method for producing embedded hydrogel contact lenses, comprising the steps of:
   (1) obtaining a first female mold half, a male mold half and a second female mold half, wherein the first female mold half has a first molding surface defining the front surface of an insert to be molded, wherein the male mold half has a second molding surface defining the posterior surface of a contact lens to be molded, wherein the second female mold half has a third molding surface defining the anterior surface of the contact lens to be molded, wherein the first female mold half and the male mold half are configured to receive each other such that an insert-molding cavity is formed between the first molding surface and a central portion of the second molding surface when the first female mold half is closed with the male mold half, wherein the second female mold half and the male mold half are configured to receive each other such that a lens-molding cavity is formed between the second and third molding surfaces when the second female mold half is closed with the male mold half;
   (2) dispensing an amount of an insert-forming composition on the first molding surface of the first female mold half;
   (3) placing the male mold half on top of the insert-forming composition in the first female mold half and closing the first female mold half and the male mold half to form a first molding assembly comprising the insert-forming composition within the insert-molding cavity;

(4) curing the insert-forming composition in the insert-molding cavity of the first molding assembly to form a molded insert;

(5) separating the first molding assembly obtained in step (4) into the first female mold half and the male mold half with the molded insert that is adhered onto the central portion of the second molding surface;

(6) dispensing a lens-forming composition in the second female mold half in an amount sufficient for filling the lens-molding cavity;

(7) placing the male mold half with the molded insert adhered thereon on top of the lens-forming composition in the second female mold half and closing the second female mold half and the male mold half to form a second molding assembly comprising the lens-forming composition and the molded insert immersed therein in the lens-molding cavity;

(8) curing the lens-forming composition in the lens-molding cavity of the second molding assembly to form an embedded hydrogel lens precursor that comprises a bulk hydrogel material formed from the lens-forming composition and the insert completely or partially embedded in the bulk hydrogel material;

(9) separating the second molding assembly obtained in step (8) into the second female mold half and the male mold half, with the embedded hydrogel lens precursor adhered on a lens-adhered mold half which is one of the male and second female mold halves;

(10) removing the embedded hydrogel lens precursor from the lens-adhered mold half; and

(11) subjecting the embedded hydrogel lens precursor to post-molding processes including a hydration process and one or more other processes selected from the group consisting of extraction, surface treatment, packaging, sterilization, and combinations thereof.

11. The method of claim 10, wherein the first female mold half comprise an overflow groove which surrounds the molding surface and into which any excess insert-forming material is pressed when the first molding assembly is closed securely, wherein any flushes formed from the excess insert-forming material during step (4) can be stuck on the first female mold half during step of separating the first molding assembly halves, thereby removing the flushes.

12. The method of claim 10, wherein the back surface of the insert merges with or is buried at a depth of less than about 10 microns beneath the posterior surface of the contact lens, and the curvature of the back surface of the insert is identical to the curvature of a central zone, which has a diameter of the insert, of the posterior surface of the contact lens.

13. The method of claim 10, wherein the step of (4) curing the insert-forming composition is carried out actinically by using UV and/or visible light.

14. The method of claim 13, wherein the step of (8) curing the lens-forming composition is carried out actinically by using UV and/or visible light.

15. The method of claim 13, wherein the step of (8) curing the lens-forming composition is carried out thermally by heating the first molding assembly in an oven at one or more curing temperature selected from about 40° C. to about 100° C.

16. The method of claim 10, wherein the step of (4) curing the insert-forming composition is carried out thermally by heating the first molding assembly in an oven at one or more curing temperature selected from about 40° C. to about 100° C.

17. The method of claim 16, wherein the step of (8) curing the lens-forming composition is carried out thermally by heating the first molding assembly in an oven at one or more curing temperature selected from about 40° C. to about 100° C.

18. The method of claim 16, wherein the step of (8) curing the lens-forming composition is carried out actinically by using UV and/or visible light.

19. An embedded hydrogel contact lens, comprising:
an anterior surface, an opposite posterior surface, a bulk hydrogel material, and an insert completely or partially embedded in the bulk hydrogel material,
wherein the insert is made of a polymeric material different from the bulk hydrogel material and has a front surface, an opposite back surface and a diameter up to about 13.0 mm,
wherein the insert is located in a central portion of the embedded hydrogel contact lens,
wherein one of the front and back surfaces of the insert is designated as an exposing surface while the other of the front and back surfaces is designated as a buried surface,
wherein the exposing surface merges with or is buried at a depth of less than about 10 microns beneath the anterior or posterior surface the curvature of which in a central zone having a diameter of the insert is substantially identical to the curvature of the exposing surface, wherein the buried surface is buried at a depth of at least about 20 microns beneath either the anterior surface or the posterior surface,
wherein the embedded hydrogel contact lens is not susceptible to delamination as demonstrated by being free of bubble when being inspected under microscopy at interfaces between the insert and the bulk material within the embedded hydrogel contact lens after being autoclaved in a packaging solution in a sealed package and then being stored for at least 3 weeks at 55° C., wherein the packaging solution is a phosphate buffered saline having a pH of 7.2±0.2.

20. The embedded hydrogel contact lens of claim 19, wherein the exposing surface merges with or is buried at a depth of less than about 10 microns beneath the anterior surface the curvature of which in the central zone having a diameter of the insert is substantially identical to the curvature of the exposing surface.

21. The embedded hydrogel contact lens of claim 19, wherein the exposing surface merges with or is buried at a depth of less than about 10 microns beneath the posterior surface the curvature of which in the central zone having a diameter of the insert is substantially identical to the curvature of the exposing surface.

22. The embedded hydrogel contact lens of claim 19, wherein the bulk hydrogel material is a non-silicone hydrogel material comprising at least 50% by mole of repeating units of at least one hydroxyl-containing vinylic monomer.

23. The embedded hydrogel contact lens of claim 19, wherein the bulk hydrogel material is a silicone hydrogel material that comprises (a) repeating units of at least one first polysiloxane vinylic crosslinker and/or at least one siloxane-containing vinylic monomer and (b) repeating units of at least one hydrophilic vinylic monomer.

* * * * *